US011111334B1

(12) United States Patent
Higginson et al.

(10) Patent No.: US 11,111,334 B1
(45) Date of Patent: *Sep. 7, 2021

(54) POLYMERIZABLE COMPOSITIONS COMPRISING NITRO SUBSTITUTED POLYESTER DIOLS

(71) Applicant: BioCellection Inc., Menlo Park, CA (US)

(72) Inventors: Cody James Higginson, Fremont, CA (US); Katrina Marie Knauer, Redwood City, CA (US); Jennifer Le Roy, Sunnyvale, CA (US); Russell Clayton Pratt, San Mateo, CA (US); David Samuel Pilsk, San Jose, CA (US)

(73) Assignee: BioCellection Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,130

(22) Filed: Jul. 9, 2020

Related U.S. Application Data

(60) Provisional application No. 62/989,122, filed on Mar. 13, 2020.

(51) Int. Cl.
| | |
|---|---|
| *C08G 63/68* | (2006.01) |
| *C08G 18/46* | (2006.01) |
| *C08G 63/91* | (2006.01) |
| *B33Y 10/00* | (2015.01) |
| *B33Y 70/00* | (2020.01) |
| *C08L 67/07* | (2006.01) |
| *C08G 63/685* | (2006.01) |
| *C08G 63/78* | (2006.01) |

(52) U.S. Cl.
CPC .......... *C08G 63/6856* (2013.01); *B33Y 10/00* (2014.12); *B33Y 70/00* (2014.12); *C08G 18/463* (2013.01); *C08G 63/78* (2013.01); *C08G 63/916* (2013.01); *C08L 67/07* (2013.01); *C08L 2312/06* (2013.01)

(58) Field of Classification Search
CPC .............. C08G 63/6856; C08G 18/463; C08G 63/916; C08G 63/78; C08L 67/07; C08L 2312/06; B33Y 10/00; B33Y 70/00
See application file for complete search history.

(56) References Cited

U.S. PATENT DOCUMENTS

| | | | |
|---|---|---|---|
| 3,245,962 A | 4/1966 | Fischer | |
| 3,475,383 A | 10/1969 | Stewart | |
| 3,745,076 A | 7/1973 | Sickman et al. | |
| 4,355,154 A * | 10/1982 | Saam | C08G 63/06 528/274 |
| 4,366,301 A * | 12/1982 | Le Roy | C08G 18/675 156/330.9 |
| 5,844,165 A | 12/1998 | Canterberry et al. | |
| 9,816,881 B2 | 11/2017 | Dehe et al. | |
| 10,519,292 B2 | 12/2019 | Yao et al. | |
| 10,557,011 B2 | 2/2020 | Yao et al. | |
| 10,696,786 B2 * | 6/2020 | Straessler | C06B 45/105 |
| 2008/0293841 A1 | 11/2008 | Andrew et al. | |

FOREIGN PATENT DOCUMENTS

| | | |
|---|---|---|
| CA | 1074494 A | 3/1980 |
| EP | 0292405 A1 | 11/1988 |
| EP | 1345975 B1 | 5/2008 |
| EP | 2935388 B1 | 2/2017 |
| ES | 2372991 T3 | 1/2012 |
| WO | WO 2019/204687 A1 | 10/2019 |

OTHER PUBLICATIONS

Hadi, A., et al., "Influences of NCO/OH and triol/diol Ratios on the Mechanical Properties of Nitro-HTPB Based Polyurethane Elastomers," *Iran. J. Chem. Chem. Eng.* 36(5):55-63, Iranian Institute of Research and Development in Chemical Industries, Iran (2017).

Kim, S.-M., et al., "Environmentally-Friendly Synthesis of Carbonate-Type Macrodiols and Preparation of Transparent Self-Healable Thermoplastic Polyurethanes," *Polymers* 9:663, MDPI AG, Switzerland (2017).

Office Action for co-pending U.S. Appl. No. 16/985,009, filed Aug. 4, 2020, U.S. Patent and Trademark Office, Alexandria, Virginia, dated Nov. 17, 2020.

Office Action for co-pending U.S. Appl. No. 16/985,009, filed Aug. 4, 2020, U.S. Patent and Trademark Office, Alexandria, Virginia, dated Sep. 8, 2020.

Notice of Allowance for co-pending U.S. Appl. No. 16/985,009, filed Aug. 4, 2020, U.S. Patent and Trademark Office, Alexandria, Virginia, dated Feb. 9, 2021.

International Search Report for International Patent Appl. No. PCT/US2021/022111, filed Mar. 12, 2021, Korean Intellectual Property Office, Daejeon, Republic of Korea, 3 pages.

Written Opinion for International Patent Appl. No. PCT/US2021/022111, filed Mar. 12, 2021, Korean Intellectual Property Office, Daejon, Republic of Korea, 5 pages.

Remias et al., "Oxidative chemical recycling of polyethylene," *Comptes Rendus de l' Académie des Sciences-Series IIC-Chemistry*, 2000, vol. 3, No. 7, pp. 627-629, Elsevier, London, United Kingdom.

Sultan et al., "Modification of cellulosic fiber with polyurethane acrylate copolymers Part I: Physiochemical properties," *Carbohydrate Polymers*, 2012, vol. 87, No. 1, pp. 397-404, Elsevier Ltd., London, United Kingdom.

* cited by examiner

*Primary Examiner* — Jessica M Roswell
(74) *Attorney, Agent, or Firm* — Sterne, Kessler, Goldstein & Fox P.L.L.C.

(57) ABSTRACT

This invention relates to the field of polymers. More specifically, the invention comprises photopolymerizable polyesters and polyester urethane oligomers comprising nitro-substituted dicarboxylic acids that are products obtained by decomposition of polyethylene. The composition described herein are useful for 3D printing, coatings and other uses.

25 Claims, 2 Drawing Sheets

POLYMERIZABLE COMPOSITIONS COMPRISING NITRO SUBSTITUTED POLYESTER DIOLS

FIELD OF THE INVENTION

This invention relates to the field of polymers. More specifically, the invention comprises polymerizable compositions comprising polyesters containing dicarboxylic acids and nitro-substituted dicarboxylic acids from recycled feedstocks.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Aliphatic polyesterols are useful intermediates for the manufacture of polyester (meth)acrylate and urethane (meth)acrylate oligomers which can be incorporated in photopolymer resins applicable for 3D printing and protective coatings. Polyesterols are usually derived from petrochemical resources. While industries are seeking sustainable sources for polyesterols, including those with recycled content, it is necessary for these products to deliver equal performance when compared to petroleum-based alternatives.

Due to the environmental concerns surrounding petrochemical sources of polyester diols, companies are increasingly seeking to offer products of improved sustainability. However, there remains a need for these products to deliver equal or better performance than their traditional petroleum-based alternatives at a comparable price point.

SUMMARY OF THE INVENTION

The following embodiments and aspects thereof are described and illustrated in conjunction with systems, compositions, methods, and articles of manufacture which are meant to be exemplary and illustrative, not limiting in scope.

Post-consumer polyethylene waste provides an abundant source of raw material for making new chemicals. Nitro-functionalized diacids are the product of chemically recycled polyethylene via Accelerated Thermal Oxidative Decomposition (ATOD™). These nitro-functionalized polyester diols are the first polyols synthesized from monomers derived from chemically recycled post-consumer polyethylene.

This invention demonstrates that photopolymer resins suitable for 3D printing applications can be prepared from polyesterols synthesized from chemical feedstocks obtained from post-consumer plastics, including (but not limited to) polyethylene. Waste thermoplastics, such as polyethylene provide an abundant source of raw material for making new polymers. Polyethylene can be chemically decomposed via the ATOD™ process into a mixture of small molecule dicarboxylic acid with varying chain lengths and degrees of nitro functionality. This invention demonstrates that these decomposition products can be chemically upcycled into polyesterols that can be used to synthesize high-performing materials such as urethane (meth)acrylates for use in 3D printing applications. To date, no photopolymer resin has been reported that contain content from recycled post-consumer plastic waste, including polyethylene. While other polyesterols derived from the decomposition products of plastic waste have been reported, these are derived from the glycolysis of polyethylene terephthalate (PET), and have not been used in the preparation of photopolymer resins suitable for 3D printing applications. This invention constitutes a unique step toward more sustainable photopolymer materials with content derived from post-consumer plastic waste.

Provided is a composition comprising a compound of the formula I

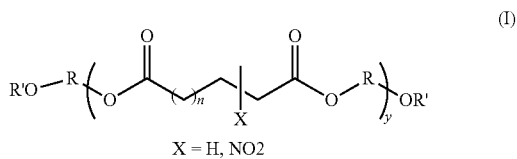

X = H, NO2 wherein n is 0-14, y is 1-100, X is either H or $NO_2$, R is an aliphatic, cycloaliphatic, aromatic, or oligoether linker, and R' is H or a photopolymerizable group, wherein at least one X is $NO_2$.

In some embodiments, R is an alkylenyl group. In some embodiments, R is ethylenyl, propylenyl, isopropylenyl, butylenyl, pentylenyl, hexylenyl, heptylenyl, or octylenyl. In some embodiments, R is an oligoether linker. In some embodiments, R is alkylenyl, wherein one or more $CH_2$ groups are substituted by —O—. In some embodiments, R is —$(CH_2)_o$—O—$(CH_2)_o$—, —$CH(CH_3)CH_2$—O—$CH_2CH(CH_3)$—, or —$CH_2$—O—$(CH_2)_o$—O—$(CH_2)_o$—$CH_2$—, wherein o is 2-8. In some embodiments, R is arylenyl or aralkylenyl. In some embodiments, R' is H. In some embodiments, R' is a photopolymerizable group. In some embodiments, the photopolymerizable group comprises one or more ethylenically unsaturated or vinyl groups, or one or more epoxy group. In some embodiments, the photopolymerizable group is an acrylate ester. In some embodiments, the acrylate ester is a methacrylate ester. In some embodiments, R' comprises the reaction product of a polyisocyanate with the compound of the formula I above, to give the corresponding urethane, then the further reaction with a hydroxy-substituted (meth)acrylate ester. In some embodiments, R' comprises the reaction product of a polyisocyanate with the compound with the formula I above to give the corresponding urethane, then the further reaction with a secondary amino-substituted (meth)acrylate ester.

In some embodiments, the compound has the formula:

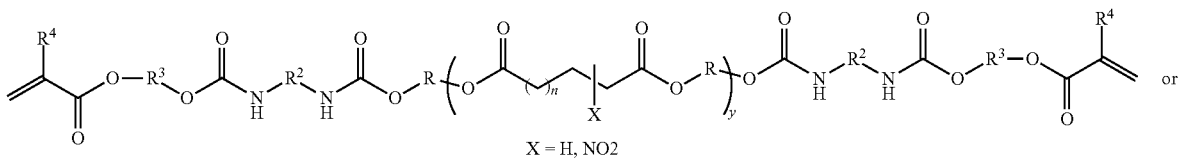

X = H, NO2

-continued

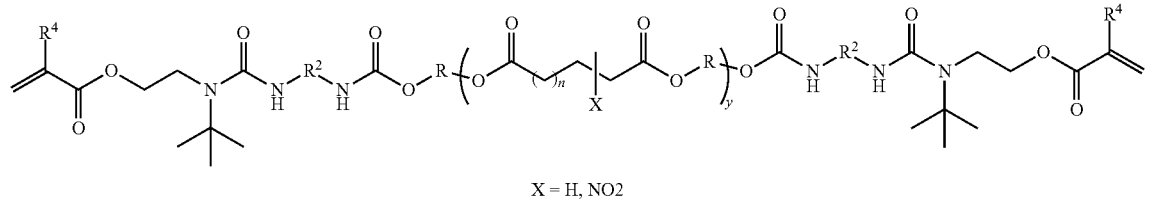

X = H, NO2 wherein n is 0-14, y is 1-100, X is either H or $NO_2$, R is an aliphatic, cycloaliphatic, aromatic, or oligoether linker, $R^2$ is an aliphatic, cycloaliphatic, or aromatic linker, $R^3$ is an aliphatic, cycloaliphatic, aromatic, or oligoether linker, and $R^4$ is H or methyl.

In another embodiment, the compound has the formula:

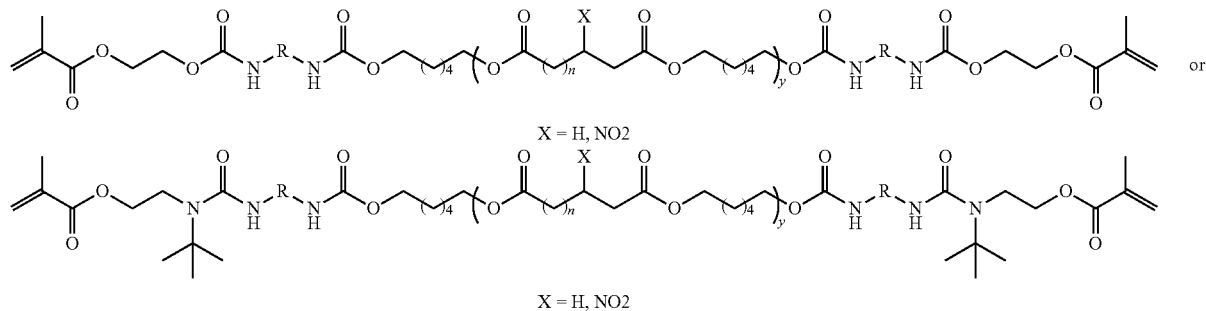

X = H, NO2

X = H, NO2 wherein n, y, X, and R are defined above.

Also provided is a method of making the composition, wherein R' is H, comprising reacting nitro-substituted dicarboxylic acid with a diol. In some embodiments, the diol is 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, diethyleneglycol, triethyleneglycol, tetraethyleneglycol, or telechelic propyleneglycols of molecular weights between 300-800 g/mol. In some embodiments, the nitro-substituted dicarboxylic acid comprises a mixture of aliphatic telechelic dicarboxylic acids with a number of carbon atoms ranging from 4-18, and nitro functional groups optionally present at one or more carbons between 2-17 in the dicarboxylic acid mixture, as represented by the structure below:

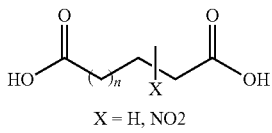

X = H, NO2 wherein n is 0-14.

In some embodiments, the condensing comprises Fischer esterification by reacting the nitro-substituted dicarboxylic acid mixtures and one or more diols in the presence of a catalyst. In some embodiments, the catalyst is a Bronsted-Lowry or Lewis acid catalyst. In some embodiments, the reaction is carried out at a temperature ranging from 60° C. to 200° C. In some embodiments, the reaction is carried out at a temperature in a range of from 90° C. to 150° C. or from 100° C. to 120° C.

Also provided is a method for preparing the composition, wherein R' is H, comprising transesterification of the ester of a nitro-substituted dicarboxylic acid with at least one diol. In some embodiments, the transesterification is carried out in the presence of a catalyst. In some embodiments, the catalyst is a Bronsted-Lowry or Lewis acid catalyst. In some embodiments, the transesterification is carried out at a temperature ranging from 60° C. to 200° C. In some embodiments, the transesterification is carried out at a temperature in a range of from 90° C. to 150° C. or from 100° C. to 120° C. In some embodiments, the diol is at least one of 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, diethyleneglycol, triethyleneglycol, tetraethyleneglycol, or telechelic propyleneglycols of molecular weights between 300-800 g/mol. In some embodiments, the ester of the nitro-substituted dicarboxylic acid is obtained by condensation of a nitro-substituted dicarboxylic acid having the formula:

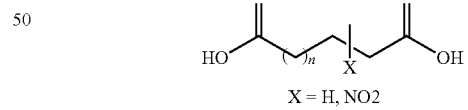

X = H, NO2 wherein n is 0-14, with an alcohol.

In some embodiments, the alcohol is a $C_{1-4}$ alcohol.

Also provided is method for preparing the composition, wherein R' is a photopolymerizable group comprising an acrylate ester, comprising reacting a polyisocyanate with the compound of the formula I above, wherein R' is H to give the corresponding urethane, then the further reacting with a hydroxy-substituted (meth)acrylate ester.

Also provided is a method for preparing the composition, wherein R' is a photopolymerizable group comprising an acrylate ester, comprising reacting a polyisocyanate with the compound of the formula I above, wherein R' is H to give the corresponding urethane, then the further reacting with a secondary amine-substituted (meth)acrylate ester.

In some embodiments, the polyisocyanate is 4,4'-di isocyanatodiphenylmethane (4,4'-MDI), 2,4'-diisocyanato diphenylmethane (2,4'-MDI), p-phenylene diisocyanate, 1,3-bis(isocyanatomethyl)cyclohexane, 1,4-diisocyanato cyclohexane, hexamethylene diisocyanate, isophorone diisocyanate, 1,5-naphthalene diisocyanate, 3,3'-dimethyl-4,4'-biphenyl diisocyanate, 4,4'-diisocyanato-dicyclohexylmethane, 2,6-toluene diisocyanate, 2,4-toluene diisocyanate, or mixtures thereof.

In some embodiments, the hydroxy-substituted acrylate ester is at least one of 2-hydroxyethyl (meth)acrylate, 3-hydroxypropyl (meth)acrylate, 4-hydroxybutyl (meth)acrylate, 5-hydroxypentyl (meth)acrylate, or 6-hydroxyhexyl (meth) acrylate, 2-(tert-butylamino)ethyl (meth)acrylate.

Also provided method for producing the compound of the formula I above, wherein R' is a photopolymerizable group, comprising reacting the compound, wherein R' is H, with one or more diisocyanates that are 1,6-hexamethylene diisocyanate (HMDI), isophorone diisocyanate (IPDI), toluene diisocyanate (TDI), methylene diphenyl diisocyanate (MDI), and at least one hydroxy-substituted (meth)acrylate ester that is 2-hydroxyethyl (meth)acrylate, 2-hydroxyethyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, or 2-(tert-butylamino)ethyl (meth)acrylate.

Also provided is a composition obtained by the methods described herein. In some embodiments, the composition comprises one or more resins, reactive diluents or additives.

Also provided is a method comprising treating a composition described herein with actinic radiation to give a cured product. In some embodiments, the actinic radiation is electron beams, X-rays, UV or visible light. In some embodiments, the actinic radiation is light with a wavelength range of 400-700 nm. In some embodiments, the actinic radiation is UV radiation.

Also provided is a method of preparing a 3D product, comprising depositing successive layers according to a predetermined pattern of a composition described herein. In some embodiments, the composition is deposited by ink-jet printing, extrusion, or vat polymerization methods including stereolithography and digital light processing. In some embodiments, the 3D product is cured with actinic radiation. In some embodiments, the actinic radiation is applied as the composition is deposited. In some embodiments, the actinic radiation is applied after the composition is deposited. In some embodiments, the actinic radiation is electron beams, X-rays, UV or visible light. In some embodiments, the actinic radiation is light with a wavelength range of 400-700 nm. In some embodiments, the actinic radiation is UV radiation.

BRIEF DESCRIPTION OF THE DRAWINGS

Exemplary embodiments are illustrated in referenced figures. It is intended that the embodiments and figures disclosed herein are to be considered illustrative rather than restrictive.

DETAILED DESCRIPTION OF THE INVENTION

Figure 1:
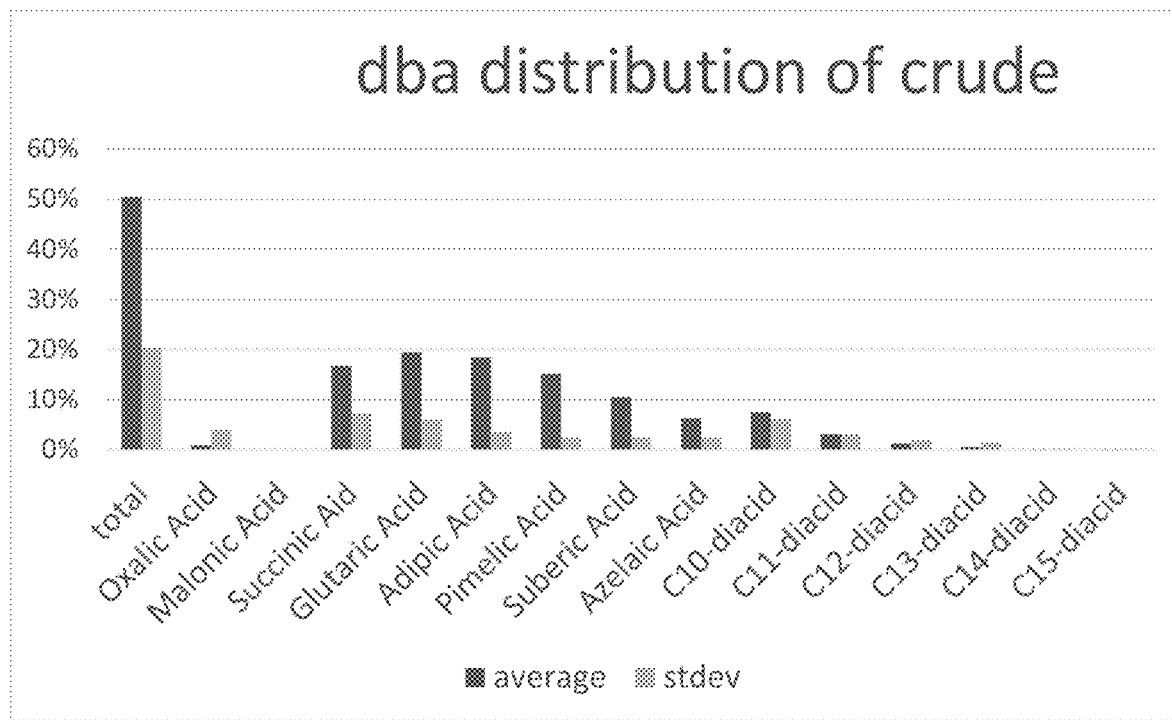
FIG. 1 depicts a bar graph showing the wt % of the dicarboxylic acids in the composition comprising nitro-substituted dicarboxylic acids.

All references cited herein are incorporated by reference in their entirety as though fully set forth. Unless otherwise defined, all technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). As used herein, the term "comprising" or "comprises" means that other elements can also be present in addition to the defined elements presented. The use of "comprising" indicates inclusion rather than limitation. Although the open-ended term "comprising" as a synonym of terms such as including, containing, or having, is used herein to describe and claim the invention, the present invention, or embodiments thereof, may alternatively be described using alternative terms such as "consisting of" or "consisting essentially of".

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

Groupings of alternative elements or embodiments of the present invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

"Optional" or "optionally" means that the subsequently described circumstance may or may not occur, so that the description includes instances where the circumstance occurs and instances where it does not.

As used herein, the term "substituted" refers to independent replacement of one or more (typically 1, 2, 3, 4, or 5) of the hydrogen atoms on the substituted moiety with substituents independently selected from the group of substituents listed below in the definition for "substituents" or otherwise specified. In general, a non-hydrogen substituent can be any substituent that can be bound to an atom of the given moiety that is specified to be substituted. Examples of substituents include, but are not limited to, acyl, acylamino, acyloxy, aldehyde, alicyclic, aliphatic, alkanesulfonamido, alkanesulfonyl, alkaryl, alkenyl, alkoxy, alkoxycarbonyl, alkyl, alkylamino, alkylcarbanoyl, alkylene, alkylidene, alkylthios, alkynyl, amide, amido, amino, amidine, aminoalkyl, aralkyl, aralkylsulfonamido, arenesulfonamido, arenesulfonyl, aromatic, aryl, arylamino, arylcarbanoyl, aryloxy, azido, carbamoyl, carbonyl, carbonyls including ketones, carboxy, carboxylates, $CF_3$, cyano (CN), cycloalkyl, cycloalkylene, ester, ether, haloalkyl, halogen, halogen, heteroaryl, heterocyclyl, hydroxy, hydroxyalkyl, imino, iminoketone, ketone, mercapto, nitro, oxaalkyl, oxo, oxoalkyl, phosphoryl (including phosphonate and phosphinate), silyl groups, sulfonamido, sulfonyl (including sulfate, sulfamoyl and sulfonate), thiols, and ureido moieties, each of which may optionally also be substituted or unsubstituted. In some cases, two substituents, together with the carbon(s) to which they are attached to, can form a ring. In some cases, two or more substituents, together with the carbon(s) to which they are attached to, can form one or more rings.

Substituents may be protected as necessary and any of the protecting groups commonly used in the art may be employed. Non-limiting examples of protecting groups may be found, for example, in Greene and Wuts, Protective Groups in Organic Synthesis, 44$^{th}$. Ed., Wiley & Sons, 2006.

The term "carboxy" means the radical —C(O)O—. It is noted that compounds described herein containing carboxy moiety can include protected derivatives thereof, i.e., where the oxygen is substituted with a protecting group. Suitable protecting groups for carboxy moieties include benzyl, tert-butyl, methyl, ethyl, and the like. The term "carboxyl" means —COOH.

The term "alkylenyl" and "aliphatic linker" refers to a divalent form of an alkyl group. In one embodiment, the alkyleneyl group is a $C_{1-24}$ alkyleneyl group. In one embodiment, the alkyleneyl group is a $C_{3-8}$ alkyleneyl group. Examples of alkylenyl groups include methylenyl, ethylenyl, propylenyl, isopropylenyl, butylenyl, pentylenyl, and hexylenyl groups.

The term "arylenyl" and "aromatic linker" refers to a divalent form of an optionally substituted aryl group. In one embodiment, the arylenyl is a divalent form of an optionally substituted phenyl. In one embodiment, the arylenyl is a divalent form of phenyl. Non-limiting exemplary alkylenyl groups include:

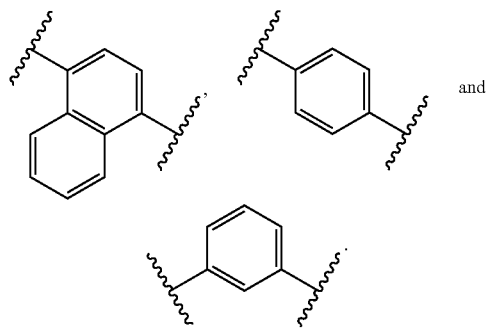

and

The term "cycloalkylenyl" and "cycloaliphatic linker" refers to a divalent form of a $C_{3-8}$ cycloalkyl group. Examples of cycloalkylenyl groups include 1,2-cyclobutenyl, 1,3-cyclobutenyl, 1,2-cyclopentenyl, 1,3-cyclopentenyl, 1,2-cyclohexenyl, 1,3-cyclohexenyl, and 1,4-cyclohexenyl.

The term "dihydroxycycloalkane" refers to a $C_{3-8}$ cycloalkyl group substituted by two hydroxyl groups. Examples of dihydroxycycloalkanes include 1,2-dihydroxycyclobutane, 1,3-dihydroxycyclobutane, 1,2-dihydroxycyclopentane, 1,3-dihydroxycyclopentane, 1,2-dihydroxycyclohexane, 1,3-dihydroxycyclohexane, and 1,4-dihydroxycyclohexane.

The term "polymer" means a substance, chemical compound or mixture of compounds, that has a molecular structure consisting chiefly or entirely of a large number of similar units (e.g., monomer units) bonded together. Of which, linear polymer is also called straight-chain because it consists of a long string of carbon-carbon bonds; branching polymer has branches at irregular intervals along the polymer chain; cross linking polymer contains branches that connect polymer chains, via covalent, ionic, or H-bonding; optionally substituted polymer is a polymer that contains functionality at random points along the hydrocarbon chain backbone where one or more of the hydrogen atoms linked to the chain backbone may be, but are not required to be substituted with a substituent independently selected from the group of substituents provided herein in the definition for "substituents" or otherwise specified. Such polymers are said to be optionally substituted because they generally do not exhibit a regular substitution pattern along the chain backbone; addition polymer is formed by adding monomers to a growing polymer chain; condensation polymer is formed when a small molecule condenses out during the polymerization reaction; homopolymer is formed by polymerizing a single monomer; copolymer is formed by polymerizing more than one monomer; synthetic polymer is synthesized through chemical reactions; natural polymer is originated in nature and can be extracted; biopolymer is produced by living organisms, modified or natural; organic polymers are polymers that contain carbon atoms in the backbone of the polymer chain.

The term "oligomer" means a substance, chemical compound or mixture of compounds that has a molecular structure consisting chiefly or entirely of a few number of similar units (e.g., monomer units) bonded together.

The term "plastic" means a synthetic material comprising a wide range of organic polymers such as polyolefins, polyesters, polyamides, etc., that can be molded into shape while soft and then set into a rigid, semi-elastic, or elastic form.

The term "about" means the recited number 10%. For example, "about 100" means 90-110, inclusive.

Various Non-Limiting Embodiments of the Invention

It is an object of the present invention to provide photopolymerizable resins made with a dicarboxylic acid composition containing nitro-substituted dicarboxylic acids.

Liquid polyester polyols (polyesterols) with varying content of nitro group functionality along the polyester backbone are synthesized via acid-catalyzed melt polycondensation of a dicarboxylic acid (DCA) blend and diol. The polyol may be optionally synthesized by transesterification of dimethyl ester blends and diols. The dicarboxylic acid monomers are derived from the chemical decomposition of post-consumer polyethylene waste and are comprised of a range of carbon chain lengths with and without nitro functional groups. The presence of the nitro groups on the DCA molecules does not hinder the polymerization between DCAs and the selected diol when compared to blends of commercial DCAs without the nitro functionality. The polyesterol molecular weight, hydroxyl number, acid number, and viscosity can be tailored by varying the diol identity, diol:DCA ratio, and reaction conditions. From these polyesterols, liquid photopolymerizable resins containing materials derived from post-consumer polyethylene waste were prepared. The suitability of these resins for 3D printing is demonstrated herewith, and a range of material properties were achievable by varying the resin composition. The liquid photopolymer resins contain (meth)acrylated oligomers derived in part from polyesterols from chemically recycled plastics, liquid meth(acrylate) esters, photoinitiators, pigments, and stabilizers.

This invention provides polyesterols, processes for making them, the use of these polyesterols in the preparation of photopolymerizable resins, and applications of these materials. In one aspect of the invention, the polyesterol is a reaction product of DCAs derived from the chemical decomposition of post-consumer polyethylene and a diol. The diol is selected from ethylene glycol, 2-methyl-1,3-propanediol, 1,4-butanediol, 1,5-propanediol, 1,6-hexanediol, or mixtures thereof. The DCAs obtained from the chemical decomposition of polyethylene consist of a mixture of carbon lengths ranging from 4-24 with or without nitro functionality on interspersing methylene groups. The molar ratio of DCA to diol ranges from 0.40 to 0.98 to yield a number average molecular weight in the range of 300 g/mol to 10,000 g/mol with an acid number of <20 mg KOH/g. In one aspect, polyesterols may be synthesized by melt polycondensation of DCAs and diols in the presence of a suitable catalyst at atmospheric pressure in air, or under vacuum to remove water byproduct to drive the reaction. In another aspect, polyols may be synthesized by transesterification between DCA dimethyl esters and diols in the presence of an appropriate catalyst at atmospheric pressure and under applied vacuum to remove methanol byproduct to drive the reaction. The catalyst may be selected from a number of Bronsted-Lowry or Lewis acids, including but not limited to sulfuric acid, p-toluenesulfonic acid, phosphoric acid, dibutyltin oxide, dibutyltin dilaurate, zinc acetate, scandium (III) triflate, titanium (IV) isopropoxide or similar compound. In another aspect, polyols may be synthesized to include aromatic co-monomers by polycondensation of DCAs derived from chemical decomposition of post-consumer polyethylene and aromatic dicarboxylic acids or anhydrides with a diol. Aromatic co-monomers are selected from terephthalic acid, isophthalic acid, phthalic acid, and phthalic anhydride.

The high recycled-content polyesterols having desirable hydroxyl numbers, viscosities, appearance, and other attributes for the synthesis of polyester urethane (meth)acrylate oligomers (PEUAs) can be made by polymerizing DCAs containing nitro functionalities with diols. The nitro groups do not hinder the polymerization and the polyesterols have good transparency and exhibit no phase separation. Furthermore, polyesterols from nitro-containing DCA mixtures and 1,6-hexanediol remain liquids at molecular weights in the range of 1500-4000 g/mol whereas polyesterols derived from C4-C9 DCAs and 1,6-hexanediol lacking nitro functionality are waxy solids not readily usable as synthetic building blocks. These polyesterols provide a sustainable alternative to bio- or petrochemical-based polyesterols for the synthesis of advanced materials. Specifically, these polyesterols are useful for the synthesis of polyester urethane (meth)acrylates which are a major component by weight of photopolymer resins useful for 3D printing. In an aspect of this invention, high recycled content polyesterols are combined with diisocyanates at room temperature to 100° C. to generate isocyanate modified prepolymers which are then reacted with an end-capping agent containing a photopolymerizable functionality at room temperature to 50° C. in air to generate photopolymerizable polyester urethane (meth) acrylate oligomers (PEUAs). Diisocyanates may be selected from aliphatic, cycloaliphatic, or aromatic diisocyanates, or derivatives with isocyanate valence greater than two. Suitable end-capping agents include 2-hydroxyethyl (meth)acrylate, 2-hydroxyethyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, 2-(tert-butylamino)ethyl (meth)acrylate, or similar. Polyesterols are preferably those derived from various diols and nitro-containing DCA mixes from chemically decomposed polyethylene waste, but may be optionally selected from polyesterols derived from recycling of other plastic waste feedstock, such as glycolysis of polyethylene terephthalate (PET) or transesterification of polylactic acid (PLA). Optionally, radical polymerization inhibitors in the form of hydroquinone or butylated hydroxytoluene (BHT) may be added to prevent gelation of the reaction mixture.

In another aspect of the invention, the isolated PEUA oligomers from the reactions above are combined with reactive diluents and photoinitiators to form a liquid photopolymerizable resin (hereafter referred to as "resin") suitable for protective coatings and 3D printing applications. These materials undergo a sol-gel transition by radical chain polymerization upon exposure to light of the appropriate wavelength to excite the photoinitiator to form an initiating radical. Reactive diluents are low-viscosity monomers bearing photopolymerizable functional groups include ethylenic unsaturated monomers such as acrylate esters, methacrylate esters, acrylamides, methacrylamides, or similar, and serve to reduce the resin viscosity without addition of solvents.

Reactive diluents can be selected from one or a combination of commonly used monomers, examples of which include but are not limited to 2-hydroxyethyl (meth)acrylate, 2-ethylhexyl (meth)acrylate, isooctyl acrylate, 1,6-hexanediol diacrylate isobornyl (meth)acrylate, etc. Photoinitiators are compounds that undergo photoreaction upon absorption of light to generate a reactive species that catalyzes or initiates other reactions, such as radical chain polymerization. Photoinitiators can be one or a combination of commonly used UV initiators, examples of which include but are not limited to acetophenones (dimethoxyaceophenone, for example), phosphine oxides (diphenyl(2,4,6-trimethylbenzoyl)phosphine oxide, TPO, for example), thioxanthones (isopropyl-thioxanthone, ITX, for example) and amine synergists, etc. The resin is comprised of PEUA in an amount of 30-90 parts per hundred resin, 9-65 parts per hundred reactive diluent, and 0.1-5 parts per hundred photoinitiator. The resin may optionally contain non-reactive pigments or particle fillers to modify the color, opacity, and mechanical properties of the resulting cured photopolymers in amounts ranging from 0.1-2 parts per hundred. These pigments and fillers may be optionally modified with surface-active agents to facilitate and stabilize dispersion of these additives. Polymerization inhibitors or stabilizers such as 2,6-tert-butyl-4-methylphenol (BHT), hydroquinone, or similar may optionally be added to improve the stability and shelf-life of the resin. In embodiments where the PEUA end-capping agent was 2-(tert-butylamino)ethyl (meth)acrylate, resins may optionally contain a multivalent amine or hydroxyl modified chain extender in the amount of 1-10 parts per hundred which will serve to facilitate the formation of high-performance poly (urethane-urea) materials in a secondary thermal cure following photopolymerization, similar to those reported by Velankar, Pezos and Cooper, Journal of Applied Polymer Science, 62, 1361-1376 (1996).

In another aspect of the invention, the liquid resins prepared above are photopolymerized by exposure to light of an appropriate wavelength (e.g. 365 nm or 405 nm light), to produced solid three-dimensional objects, preferably in the context of photopolymer stereolithography (SLA), digital light processing (DLP), UV-LCD 3D printing, or similar. The mechanical properties of the cured materials vary with the resin composition (polyesterol molecular weight and composition, PEUA composition and content, reactive diluent composition and content, photoinitiator content). Photopolymerization of a library of resin compositions in the form of cast films have been achieved by exposure to 365 nm and 405 nm UV-LED light (~70 W output). Additionally, 3D printing of various 3D objects has been achieved, including tensile testing specimens (e.g. dogbones) ISO 527-2 Type 1A and Type 5A, and ASTM D638-14 Type IV on a commercially available photopolymer printer (ELEGOO Mars UV-LCD 3D printer) at temperatures of 19-35° C. from selected resins with sufficiently low viscosity. After printing, parts are washed with isopropanol (or other appropriate solvent or washing solution), air dried, and post-cured in an air oven at 50-100° C. for 1 hour, and irradiation with 405 nm light from 70 W UV-LED flood source for 10-20 minutes. For resins containing PEUAs end-capped with 2-(tert-butylamino)ethyl (meth)acrylate and chain extenders, thermal post-curing at 125° C. for 2-6 hours was used in lieu of thermal and UV post-curing. Post-curing time, temperature, and light wavelength and intensity can be modified as required to achieve optimal mechanical properties for a given cured resin. Young's moduli of photocured materials obtained range from 0.05 GPa to 1 GPa, but can be tuned to achieve a broader range. Tensile strengths of materials obtained range from 14 MPa to 36 MPa, but can be tuned to achieve a broader range. Tensile strain at break of materials obtained range from 38% to 120% strain, but can be tuned to achieve a broader range. These materials represent the first examples of 3D printed photopolymers with components derived from post-consumer plastic waste.

There is a fair amount of variation that can take place within this invention and yet achieve the objective it aims to solve (polyesterols and photopolymer resins containing content from post-consumer plastic waste). Aspects that can be varied while achieving the overall objective are listed below:

Polyesterol synthesis and composition:
  Diol comonomer combined with dicarboxylic acid mixture.
  Optionally including diols, triols, tetraols to introduce branch points
  Catalyst employed in polyesterol synthesis
  Addition of a reaction solvent to azeotropically remove water
  Addition of an apparatus to facilitate removal of water or other volatile byproduct from the reaction (e.g. bubbling inert gas through the reaction, application of a Dean-Stark or Soxhlet apparatus, application of vacuum at any point in the reaction)
Polyester urethane (meth)acrylate oligomer synthesis:
  Polyesterol composition and molecular weight
  Diisocyanate/polyisocyanate employed
  End-capping agent identity used in the synthesis
  Order of addition of reaction components during oligomer synthesis
Photopolymer resin formulation:
  Polyester urethane (meth)acrylate oligomer composition and amount in resin
  Reactive diluent composition and amount in resin
  Photoinitiator identity and amount in resin
  Stabilizer/polymerization inhibitor identity and amount in resin
  Non-reactive pigment or particle filler identity, and amount (up to a maximum that interferes with effective photopolymerization)
Photopolymerization and 3D printing:
  Application of different wavelength light or other radiation sources in curing (e.g. electron beam)
  Modification or use of another 3D printing apparatus, temperature, or technology
  Application of different post-print washing protocols/ apparatus or post-curing treatments Nitro-Substituted Dicarboxylic Acid Compositions Nitro-substituted dicarboxylic acid compositions may be prepared according to U.S. Pat. Nos. 10,519,292 and 10,557, 011, the contents of which are fully incorporated by reference. The nitro-substituted dicarboxylic acids produced are in admixture with other dicarboxylic acids. The process comprises:
  a. adding polyethylene (PE) to a reaction vessel;
  b. adding aqueous nitric acid ($HNO_3$) to the reaction vessel to give a mixture, wherein the wt. ratio of PE to aqueous nitric acid is greater than 1:3; and
  c. subjecting the mixture obtained in b. to conditions effective to decompose the PE to produce the dicarboxylic acids and nitro-substituted dicarboxylic acids.

The nitric acid may have a concentration of 10-90 wt %. In some embodiments, the nitric acid has a concentration of about 67 to 90 wt %. In some embodiments, the weight ratio of PE to nitric acid is 1:10 to 1:100. In some embodiments, a catalyst is added to the reaction such as a zeolite, alumina, silico-alumino-phosphate, sulfated zirconia, zinc oxide, titanium oxide, zirconium oxide, niobium oxide, iron carbonate, calcium carbide, or combinations thereof. In some embodiments, the conditions effective comprise a temperature range of about 60° C. to about 200° C. In some embodiments, the conditions effective comprise an initial pressure of 0-1000 psi. In some embodiments, the conditions effective comprise a batch process with a residence time in the reaction vessel of about 1 hour to about 10 hours. In some embodiments, the conditions effective comprise a continuous process. The dicarboxylic acids and nitro-dicarboxylic acids are then isolated, for example, by filtration of the mixture and evaporation of the nitric acid, e.g., under reduced pressure. The dicarboxylic acids and nitro-dicarboxylic acids may then be esterified, e.g., in the presence of an acid catalyst such as hydrochloric or sulphuric acids in the presence of an alcohol, e.g., a $C_{1-4}$ alcohol, to give the corresponding dicarboxylic and nitro-dicarboxylic acid $C_{1-4}$ esters. In some embodiments, the $C_{1-4}$ esters are methyl, ethyl, propyl, butyl, or pentyl esters.

In some embodiments, succinic acid is present in an amount of from about 10 to about 25 wt %, glutaric acid is present in an amount of from about 11 to about 25 wt %, adipic acid is present in an amount of about 14 to about 22 wt %, pimelic acid is present in an amount of about 10 to about 20 wt %, and azelaic acid is present in an amount of about 3 to about 10 wt %, or an equivalent amount of the esters thereof, and if present, oxalic acid is present in an amount up to 10 wt %, if present suberic acid is present in an amount of about 5 to about 16 wt %, if present sebacic acid is present in an amount of about 1 to about 15 wt %, if present undecanedioic acid is present in an amount of about 1 to about 8 wt %, if present dodecanedioic acid is present up to about 5 wt %, if present tridecanedioic acid is present up to about 4 wt %, if present tetradecanedioic acid is present up to about 2 wt %, if present pentadecanedioic acid is present up to about 1 wt %, if present hexadecanedioic acid is present up to about 1 wt %, if present heptadecanedioic acid is present up to about 1 wt %, and if present octadecanedioic acid is present up to about 1 wt % or an equivalent amount of the esters thereof.

In some embodiments, succinic acid is present in an amount of from about 15 to about 19 wt %, glutaric acid is present in an amount of from about 17 to about 21 wt %, adipic acid is present in an amount of about 16 to about 20 wt %, pimelic acid is present in an amount of about 13 to about 17 wt %, and azelaic acid is present in an amount of about 4 to about 8 wt %, or an equivalent amount of the esters thereof, and if present, oxalic acid is present in an amount up to 10 wt %, if present suberic acid is present in an amount of about 9 to about 13 wt %, if present sebacic acid is present in an amount of about 5 to about 9 wt %, if present undecanedioic acid is present in an amount of about 2 to about 4 wt %, if present dodecanedioic acid is present in an amount of about 1 to about 3 wt %, if present tridecanedioic acid is present in an amount of about 0.5 to about 1.5 wt %, if present tetradecanedioic acid is present up to about 0.2 wt %, if present pentadecanedioic acid is present up to about 0.2 wt %, if present hexadecanedioic acid is present up to about 0.2 wt %, if present heptadecanedioic acid is present up to about 0.2 wt %, and if present octadecanedioic acid is present up to about 0.2 wt % or an equivalent amount of the esters thereof.

In some embodiments, succinic acid is present in an amount of from about 5 to about 40 wt %, glutaric acid is present in an amount of from about 8 to about 27 wt %, adipic acid is present in an amount of about 10 to about 29 wt %, pimelic acid is present in an amount of about 10 to about 20 wt %, and azelaic acid is present in an amount of about 1 to about 13 wt %, or an equivalent amount of the esters thereof, and if present, oxalic acid is present in an amount up to 10 wt %, if present suberic acid is present in an amount of to about 4 to about 20 wt %, if present sebacic acid is present up to about 12 wt %, if present undecanedioic acid is present up to about 8 wt %, if present dodecanedioic acid is present up to about 5 wt %, if present tridecanedioic acid is present up to about 4 wt %, if present tetradecanedioic acid is present up to about 2 wt %, if present pentadecanedioic acid is present up to about 0.4 wt %, if present hexadecanedioic acid is present up to about 0.4 wt %, if present heptadecanedioic acid is present up to about 0.4 wt %, and if present octadecanedioic acid is present up to about 0.4 wt % or an equivalent amount of the esters thereof.

In some embodiments, the dicarboxylic acids further comprise at least one $C_8$-$C_{20}$ dicarboxylic acid substituted with a single nitro group or the esters thereof. The nitro-substituted $C_8$-$C_{20}$ dicarboxylic acids may be substituted in the 2-, 3-, 4-, 5-, 6-, 7-, or 8-position of the dicarboxylic acid.

In some embodiments, at least one nitro-substituted dicarboxylic acid is 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, or 2-nitro-icosanedioic acid, or the esters thereof.

In some embodiments, the dicarboxylic acids comprise:
a. oxalic acid, succinic acid, glutaric acid, adipic acid, pimelic acid, suberic acid, azelaic acid, C10-dicarboxylic acid, C11-dicarboxylic acid, C12-dicarboxylic acid, C13-dicarboxylic acid, C14-dicarboxylic acid and C15-dicarboxylic acid, or the esters thereof, and
b. at least one $C_8$-$C_{20}$ dicarboxylic acid substituted with a single nitro group, or the esters thereof.

In some embodiments, the at least one $C_8$-$C_{20}$ dicarboxylic acid substituted with a single nitro group is nitro-suberic acid, nitro-azelaic acid, nitro-sebacic acid, nitro-undecanedioic acid, nitro-dodecanedioic acid, nitro-brassylic acid, nitro-tetradecanedioic acid, nitro-pentadecanedioic acid, nitro-hexadecanedioic acid, nitro-heptadecanedioic acid, nitro-octadecanedioic acid, nitro-nonadecanedioic acid, or nitro-icosanedioic acid, or the esters thereof. In some embodiments, the $C_8$-$C_{20}$ dicarboxylic acid is 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, or 2-nitro-icosanedioic acid, or the esters thereof. In some embodiments, the $C_8$-$C_{20}$ dicarboxylic acid is 3-nitro-suberic acid, 3-nitro-azelaic acid, 3-nitro-sebacic acid, 3-nitro-undecanedioic acid, 3-nitro-dodecanedioic acid, 3-nitro-brassylic acid, 3-nitro-tetradecanedioic acid, 3-nitro-pentadecanedioic acid, 3-nitro-hexadecanedioic acid, 3-nitro-heptadecanedioic acid, 3-nitro-octadecanedioic acid, 3-nitro-nonadecanedioic acid, or 3-nitro-icosanedioic acid, or the esters thereof. In some embodiments, the $C_8$-$C_{20}$ dicarboxylic acid is 4-nitro-suberic acid, 4-nitro-azelaic acid, 4-nitro-sebacic acid, 4-nitro-undecanedioic acid, 4-nitro-dodecanedioic acid, 4-nitro-brassylic acid, 4-nitro-tetradecanedioic acid, 4-nitro-pentadecanedioic acid, 4-nitro-hexadecanedioic acid, 4-nitro-heptadecanedioic acid, 4-nitro-octadecanedioic acid, 4-nitro-nonadecanedioic acid, or 4-nitro-icosanedioic acid, or the esters thereof. In some embodiments, the $C_8$-$C_{20}$ dicarboxylic acid is 5-nitro-suberic acid, 5-nitro-azelaic acid, 5-nitro-sebacic acid, 5-nitro-undecanedioic acid, 5-nitro-dodecanedioic acid, 5-nitro-brassylic acid, 5-nitro-tetradecanedioic acid, 5-nitro-pentadecanedioic acid, 5-nitro-hexadecanedioic acid, 5-nitro-heptadecanedioic acid, 5-nitro-octadecanedioic acid, 5-nitro-nonadecanedioic acid, or 5-nitro-icosanedioic acid, or the esters thereof. In some embodiments, the at least one $C_8$-$C_{20}$ dicarboxylic acid substituted with a single nitro group is present up to about 50 wt % in the decomposition mixture.

In some embodiments, the nitro-dicarboxylic acid composition comprises the dicarboxylic acids in the amounts shown in FIG. 1.

Esters of Dicarboxylic Acids

In some embodiments, the dicarboxylic acids and nitro-dicarboxylic acids are in an ester form. These esters are prepared under esterification conditions. In some embodiments, the dicarboxylic acids are at least partially in the form of esters.

In some embodiments, the esters are methyl esters, ethyl esters, propyl esters, isopropyl esters, butyl esters, isobutyl esters, sec-butyl esters, tert-butyl esters, pentyl esters, or hexyl esters, or combinations thereof. In some embodiments, the ester is a methyl ester. In some embodiments, the converting is carried out by esterification or esterifying.

Any suitable esterification conditions known in the art may be used to form the esters. For example, the dicarboxylic acids and nitro-dicarboxylic acids can be admixed with at least one alcohol and the admixture heated to cause esterification. A mineral acid or organic acid may be added as a catalyst. In some embodiments, the at least one alcohol is selected from a group consisting of linear alcohol, branched alcohol, cyclic alcohol, and combinations thereof. In some embodiments, the at least one alcohol is at least one selected from the group consisting of methanol, ethanol, propanol, isopropanol, butanol, isobutanol, sec-butanol, tert-butanol, pentanol, hexanol, and combinations thereof. In some embodiments, the at least one alcohol is a $C_1$-$C_{10}$ alcohol. In some embodiments, the at least one alcohol is a $C_1$-$C_4$ alcohol. In some embodiments, the at least one alcohol is methanol.

In some embodiments, the succinic acid, glutaric acid, adipic acid, pimelic acid, suberic acid, and azelaic acid are each independently in an ester form.

In some embodiments, the oxalic acid, suberic acid, sebacic acid, undecanedioic acid, dodecanedioic acid, tridecanedioic acid, tetradecanedioic acid, pentadecanedioic acid, 2-octenedioic acid, 2-nonenedioic acid, 2-decenedioic acid, and 2-undecenedioic acid are independently in an ester form.

In some embodiments, the 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, and 2-nitro-icosanedioic acid are independently in an ester form.

In some embodiments, the $C_8$-$C_{20}$ dicarboxylic acid substituted with a single nitro group is in an ester form. In some embodiments, the $C_8$-$C_{20}$ dicarboxylic acid substituted with a single nitro group in the form of an ester is nitro-suberic acid, nitro-azelaic acid, nitro-sebacic acid, nitro-undecanedioic acid, nitro-dodecanedioic acid, nitro-brassylic acid, nitro-tetradecanedioic acid, nitro-pentadecanedioic acid, nitro-hexadecanedioic acid, nitro-heptadecanedioic acid, nitro-octadecanedioic acid, nitro-nonadecanedioic acid, or nitro-icosanedioic acid. In some embodiments, the $C_8$-$C_{20}$ dicarboxylic acid is 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, or 2-nitro-icosanedioic acid, or the esters thereof. In some embodiments, the ester form is selected from the group consisting of monoester, diester, multiester, mixed diester, mixed multiester, and combinations thereof.

The term "multiester" as used herein means an ester formed by converting more than one carboxyl group from a dicarboxylic acid form to an ester form under esterification conditions.

In some embodiments, the at least one ester comprises dimethyl succinate, dimethyl glutarate, dimethyl adipate, dimethyl pimelate, dimethyl suberate, dimethyl azelate, dimethyl sebacate, dimethyl undecanedioate, dimethyl dodecanedioate, dimethyl oxalate, dimethyl tridecanedioate, dimethyl tetradecanedioate, dimethyl pentadecanedioate, dimethyl 2-octenedioate, dimethyl 2-nonenedioate, 2-dimethyl 2-decenedioate, dimethyl 2-undecenedioate, dimethyl 2-nitro-suberate, dimethyl 2-nitro-azelate, dimethyl 2-nitro-sebacate, dimethyl 2-nitro-undecanedioate, dimethyl 2-nitro-dodecanedioate, dimethyl 2-nitro-brassylate, dimethyl 2-nitro-heptadecanedioate, dimethyl 2-nitro-octadecanedioate, dimethyl 2-nitro-tetradecanedioate, dimethyl 2-nitro-pentadecanedioate, dimethyl 2-nitro-hexadecanedioate, 2-nitro-heptadecanedioate, dimethyl 2-nitro-suberate, dimethyl 2-nitro-sebacate, dimethyl 2-nitro-undecanedioate, dimethyl 2-nitro-dodecanedioate, dimethyl 2-nitro-tetradecanedioate, dimethyl 2-nitro-pentadecanedioate, dimethyl 3-nitro-suberate, dimethyl 3-nitro-azelate, dimethyl 3-nitro-sebacate, dimethyl 3-nitro-undecanedioate, dimethyl 3-nitro-dodecanedioate, dimethyl 3-nitro-brassylate, dimethyl 3-nitro-heptadecanedioate, dimethyl 3-nitro-octadecanedioate, dimethyl 3-nitro-tetradecanedioate, dimethyl 3-nitro-pentadecanedioate, dimethyl 3-nitro-hexadecanedioate, 3-nitro-heptadecanedioate, dimethyl 3-nitro-suberate, dimethyl 3-nitro-sebacate, dimethyl 3-nitro-undecanedioate, dimethyl 3-nitro-dodecanedioate, dimethyl 3-nitro-tetradecanedioate, dimethyl 3-nitro-pentadecanedioate, dimethyl 4-nitro-suberate, dimethyl 4-nitro-azelate, dimethyl 4-nitro-sebacate, dimethyl 4-nitro-undecanedioate, dimethyl 4-nitro-dodecanedioate, dimethyl 4-nitro-brassylate, dimethyl 4-nitro-heptadecanedioate, dimethyl 4-nitro-octadecanedioate, dimethyl 4-nitro-tetradecanedioate, dimethyl 4-nitro-pentadecanedioate, dimethyl 4-nitro-hexadecanedioate, 4-nitro-heptadecanedioate, dimethyl 4-nitro-suberate, dimethyl 4-nitro-sebacate, dimethyl 4-nitro-undecanedioate, dimethyl 4-nitro-dodecanedioate, dimethyl 4-nitro-tetradecanedioate, dimethyl 4-nitro-pentadecanedioate, dimethyl 5-nitro-suberate, dimethyl 5-nitro-azelate, dimethyl 5-nitro-sebacate, dimethyl 5-nitro-undecanedioate, dimethyl 5-nitro-dodecanedioate, dimethyl 5-nitro-brassylate, dimethyl 5-nitro-heptadecanedioate, dimethyl 5-nitro-octadecanedioate, dimethyl 5-nitro-tetradecanedioate, dimethyl 5-nitro-pentadecanedioate, dimethyl 5-nitro-hexadecanedioate, 5-nitro-heptadecanedioate, dimethyl 5-nitro-suberate, dimethyl 5-nitro-sebacate, dimethyl 5-nitro-undecanedioate, dimethyl 5-nitro-dodecanedioate, dimethyl 5-nitro-tetradecanedioate, and dimethyl 5-nitro-pentadecanedioate, and combinations thereof.

In some embodiments, the at least one corresponding ester comprises dimethyl succinate, dimethyl glutarate, dimethyl adipate, dimethyl pimelate, dimethyl suberate, dimethyl azelate, dimethyl sebacate, dimethyl undecanedioate, dimethyl dodecanedioate, and combinations thereof.

In some embodiments, the at least one ester comprises of 5-50% dimethyl succinate, 5-50% dimethyl glutarate, 5-50% dimethyl adipate, 5-50% dimethyl pimelate, 0-30% dimethyl suberate, 0-30% dimethyl azelate, 0-20% dimethyl sebacate, 0-10% dimethyl undecanedioate, 0-10% dimethyl dodecanedioate, and combinations thereof.

In some embodiments, the at least one corresponding ester is comprises of 5-50% dimethyl succinate, 5-50% dimethyl glutarate, 5-50% dimethyl adipate, 5-50% dimethyl pimelate, 0-30% dimethyl suberate, 0-30% dimethyl azelate, 0-20% dimethyl sebacate, 0-10% dimethyl undecanedioate, 0-10% dimethyl dodecanedioate, and combinations thereof.

In some embodiments, the esterification mixture comprises a composition comprising at least one of dimethyl succinate, dimethyl glutarate, dimethyl adipate, dimethyl pimelate, dimethyl suberate, dimethyl azelate, dimethyl sebacate, dimethyl undecanedioate, dimethyl dodecanedioate, and combinations thereof.

In some embodiments, the esterification mixture comprises a composition comprising at least one of 5-50% dimethyl succinate, 5-50% dimethyl glutarate, 5-50% dimethyl adipate, 5-50% dimethyl pimelate, 0-30% dimethyl suberate, 0-30% dimethyl azelate, 0-20% dimethyl sebacate, 0-10% dimethyl undecanedioate, 0-10% dimethyl dodecanedioate, and combinations thereof.

In some embodiments, the esterification mixture comprises at least one of dimethyl succinate in an amount of from about 5 to about 18 wt %, dimethyl glutarate in an amount of from about 8 to about 28 wt %, dimethyl adipate in an amount of about 10 to about 29 wt %, dimethyl pimelate in an amount of about 10 to about 20 wt %, and dimethyl azelate in an amount of about 8 to about 13 wt %, and combinations thereof.

In some embodiments, the esterification mixture comprises at least one of dimethyl oxalate in an amount up to 10 wt %, dimethyl suberate in an amount of about 9 to about 20 wt %, dimethyl sebacate in an amount of about 1 to about 10 wt %, dimethyl undecanedioate in an amount of about 1 to about 8 wt %, dimethyl dodecanedioate up to about 5 wt %, dimethyl tridecanedioate up to about 4 wt %, dimethyl tetradecanedioate up to about 2 wt %, and dimethyl pentadecanedioate up to about 0.4 wt %, and combinations thereof.

In some embodiments, the esterification mixture comprises at least one of dimethyl succinate in an amount of from about 5 to about 40 wt %, dimethyl glutarate in an amount of from about 8 to about 27 wt %, dimethyl adipate in an amount of about 10 to about 29 wt %, dimethyl pimelate in an amount of about 10 to about 20 wt %, and dimethyl azelate in an amount of about 1 to about 13 wt %, and combinations thereof.

In some embodiments, the esterification mixture comprises at least one of dimethyl oxalate in an amount up to 10 wt %, dimethyl suberate in an amount of to about 4 to about 20 wt %, dimethyl sebacate up to about 10 wt %, dimethyl undecanedioate up to about 8 wt %, dimethyl dodecanedioate up to about 5 wt %, dimethyl tridecanedioate up to about 4 wt %, dimethyl tetradecanedioate up to about 2 wt %, and dimethyl pentadecanedioate up to about 0.4 wt %, and combinations thereof.

In some embodiments, the esters are of:
a. oxalic acid, succinic acid, glutaric acid, adipic acid, pimelic acid, suberic acid, azelaic acid, C10-dicarboxylic acid, C11-dicarboxylic acid, C12-dicarboxylic acid, C13-dicarboxylic acid, C14-dicarboxylic acid and C15-dicarboxylic acid, and
b. at least one C8-C20 dicarboxylic acid substituted with a single nitro group; and at least one polyol.

In some embodiments, the method further comprises separating the at least one corresponding ester. In some embodiments, the separating is carried out by distillation. In some embodiments, the distillation is at least one selected from the group consisting of simple distillation, fractional distillation, vacuum distillation, azeotropic distillation, co-distillation, and combinations thereof.

In some embodiments, the method further comprises converting the at least one compound containing at least one carboxyl group from the ester form to an acid form (e.g., converting the ester form back to the acid form). In some embodiments, the converting of the ester form to the acid form is performed under ester hydrolysis conditions.

Nitro-Functionalized Polyester Diols ($NO_2$-PED)

The invention also provides nitro-functionalized polyester polyols ($NO_2$-PED) by reacting the dicarboxylic acids and nitro-dicarboxylic acids or esters thereof with a diol.

Polyester diols have the formula I:

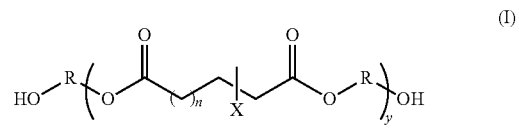

wherein n is 0-14, y is 1-100, X is H or $NO_2$, and R is alkylenyl, alkylenyl with one or more $CH_2$ groups substituted by —O—, cycloalkylenyl, or arylenenyl.

In some embodiments, R is ethylenyl, propylenyl, isopropylenyl, butylenyl, pentylenyl, hexylenyl, heptylenyl, or octylenyl. In some embodiments, R is alkylenyl, wherein one or more $CH_2$ groups are substituted by —O—. In some embodiments, R is —$(CH_2)_o$—O—$(CH_2)_o$—, —$CH(CH_3)$$CH_2$—O—$CH_2CH(CH_3)$—, or —$CH_2$—O—$(CH_2)_o$—O—$(CH_2)_o$—$CH_2$—, wherein o is 2-8. In some embodiments, polyester diol before reaction with the isocyanate has a molecular weight of 300-10,000 g/mol.

Examples of diols include, for instance, 1,2-propanediol, 1,3-propanediol, 1,4-butanediol, 1,2-butanediol, 1,3-butanediol, 1,5-pentanediol, 1,6-hexanediol, 1,9-nonanediol, 1,10-decanediol, ethylene glycol, diethylene glycol, triethylene glycol, polyethylene glycol, dipropylene glycol, tripropylene glycol, glycerol, trimethylol ethane, trimethylol propane, neo-pentyl glycol, pentaerythritol, dipentaerythritol, sorbitol, 2-methyl-1,3-propanediol, 2,2-dimethyl-1,3-propanediol, 2-ethyl-1,3-propanediol, 2,2-diethyl-1,3-propanediol, 2-propyl-2-methyl-1,3-propanediol, 2-propyl-2-ethyl-1,3-propanediol, 2-butyl-2-ethyl-1,3-propanediol (BEPD), hydroxy pivaloyl hydroxy pivalate (HPHP), 2-cyclohexyl-2-methyl-1,3-propanediol, 2-phenyl-2-methyl-1,3-propanediol, 1,4-cyclohexanediol, 2,4-diethyl-1,5-pentanediol, dihydroxymethoxy hydroquinone, 1,4-cyclohexanedimethanol, and 1,4-dihydroxycyclohexane. In some embodiments, the diols are $C_{1-8}$ diols, e.g. or $C_{1-4}$ diols, for instance diethylene glycol, 1,2-propanediol, and 1,3-propanediol.

Examples of polyether diols include, for instance, polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds (e.g. ethylene oxide, isobutene oxide, tetrahydrofuran, 2-methyltetrahydrofuran, 3-methyltetrahydrofuran, phenyl glycidyl ether, or butyl glycidyl ether).

The $NO_2$-PEDs are prepared by reacting the dicarboxylic acids and nitro-carboxylic acids or esters thereof under suitable reaction conditions. In some embodiments, the $NO_2$-PEDs are synthesized according to the following general procedure and as represented in Scheme 1: The dicarboxylic acid mixture is combined with diol (e.g. 1,6-hexanediol) and a catalytic amount of concentrated sulfuric acid or other suitable catalyst; catalyst loading may vary between 0.2 mole percent (mol %) to 4 mol %. The mixture is heated while stirring in a pre-warmed oil bath at 100-110° C. for 2-4 hours under atmospheric pressure, followed by application of reduced pressure (≤19 mbar) for 1-2 hours. The product is cooled under vacuum, and characterized by ATR-FTIR analysis and end group titration (total acid number and hydroxyl number). Titrations are performed using Test Method A according to ASTM D-4274-99 with slight modifications, and results are used to calculate approximate polyester diol molecular weight. Polyester diols stored outside of a desiccator for prolonged periods are dried prior to use by overnight incubation in a vacuum oven at 80° C., or by bubbling dry inert gas (e.g. argon) through the polyol at ≥100° C. while simultaneous applying vacuum for 1 hour, followed by storage in an ambient pressure desiccator. The reaction is typically carried out at atmospheric pressure, but other pressures may be used.

Scheme 1

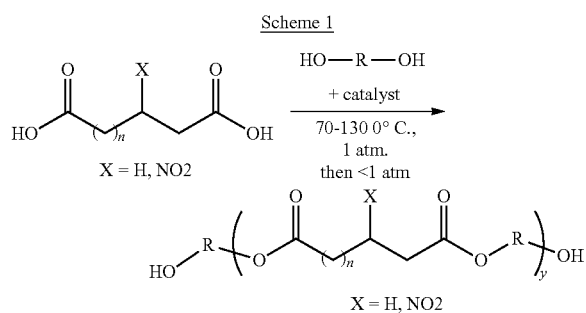

In Scheme 1, n is 0-20, and y is 1-100. In some embodiments, y is 1-30.

In another embodiment, the $NO_2$-PEDs are prepared by reacting the esters of the dicarboxylic acids and nitro-dicarboxylic acids with the polyol also in the presence of a suitable catalyst such as sulfuric acid or other mineral acid according to Scheme 2.

Scheme 2

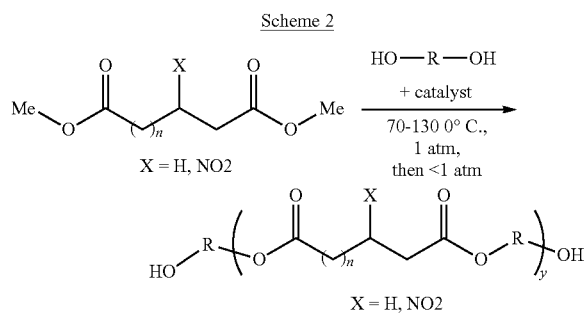

In Scheme 2, n is 0-20, and y is 1-100. In some embodiments, y is 1-30.

The catalyst may be hydrochloric acid, sulphuric acid, or other mineral acid. In the alternative, the catalyst may be dibutyl tin(IV) dilaurate in an organic solvent such as heptane. The mixture may be heated while stirring at 100-130° C. for 1-20 hours under atmospheric pressure and the alcohol by-product (e.g., methanol) and organic solvent, if used (e.g., heptane), is evaporated and removed from the reactor. In some embodiments, this is followed by application of reduced pressure (≤19 mbar) for 1-20 hours. Removal of the alcohol by-product and organic solvent may also be removed by bubbling an inert gas though the mixture while applying a vacuum for 1 hour.

The number average molecular weight of the $NO_2$-PEDs range from 300 to 10000 g/mol. In some embodiments, the number average molecular weight is about 500 to about 4000 g/mol.

Photopolymerizable Resins

The photopolymerizable group may comprise a urethane linked to a group that is photopolymerizable. In some embodiments, the $NO_2$-PED-urethanes may be prepared by reacting the $NO_2$-PEDs with a polyisocyanate. The $NO_2$-PED is reacted with a polyisocyanate at temperatures up to 80° C. in an organic solvent.

Examples of polyisocyanates include, for instance, 2,4-tolylene diisocyanate, 2,6-tolylene diisocyanate, 1,3-xylylene diisocyanate, 1,4-xylylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexyl methane diisocyanate, methylenebis(4-cyclohexylisocyanate), hydrogenated diphenylmethane diisocyanate, 2,2,4-trimethylhexamethylene diisocyanate, bis(2-isocyanatoethyl)fumarate, 6-isopropyl-1,3-phenyl diisocyanate, 4-diphenylpropane diisocyanate, lysine diisocyanate, and mixtures thereof. In one embodiment, the polyisocyanate comprises an aromatic ring.

In some embodiments, the polyisocyanate is 4,4'-diisocyanatodiphenylmethane (4,4'-MDI), 2,4'-diisocyanato diphenylmethane (2,4'-MDI), p-phenylenediisocyanate, 1,3-bis(isocyanatomethyl)-cyclohexane, 1,4-diisocyanato-cyclohexane, hexamethylenediisocyanate, isophorone diisocyanate, 1,5-naphthalene diisocyanate, 3,3'-dimethyl-4,4'-biphenyldiisocyanate, 4,4'-diisocyanato-dicyclohexylmethane, 2,6-toluene diisocyanate, 2,4-toluene diisocyanate, or mixtures thereof.

In some embodiments, the ratio of polyisocyanate to active hydrogen containing group (the NCO index divided by 100) is from 0.9-2. As is known in the art, the NCO index is defined as the number of equivalents of isocyanate, divided by the total number of equivalents of active hydrogen, multiplied by 100. The NCO index is represented by the following formula:

$$\text{NCO index} = \left[\frac{\text{NCO}}{\text{OH} + \text{NH}}\right] * 100$$

In some embodiments, the urethane is then reacted with an amino- or hydroxy-substituted photopolymerizable group in an organic solvent. Examples of amino- and hydroxy-substituted photopolymerizable groups include amino- and hydroxy-substituted alkyl acrylates. Examples of aminoand hydroxy alkyl acrylates include at least one of 2-hydroxyethyl acrylate, 3-hydroxypropyl acrylate, 4-hydroxybutyl acrylate, 5-hydroxypentyl acrylate, or 6-hydroxyhexyl acrylate, 2-(tert-butylamino)ethyl(meth)acrylate. In another embodiment, the hydroxy-substituted acrylate is 2-hydroxyethyl (meth)acrylate, 2-hydroxyethyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, 2-(tert-butylamino)ethyl (meth)acrylate, or mixtures thereof. In some embodiments the photopolymerizable group comprises a (meth)acrylate ester. The nitro-containing polyester (meth)acrylate resins are produced by the esterification of $NO_2$-PEDs with (meth)acrylic acid in the presence of radical inhibitors such as butylated hydoxytoluene and p-toluenesulfonic acid or other suitable catalyst.

Optional Additives

There are a number of optional additives for the photopolymerizable resin compositions of the invention. The optional additives include further crosslinking agents, oligomers, light stabilizers, UV stabilizers, inorganic and organic fillers, flame retardants, dispersants, reactive diluents, free radical photoinitiators, cationic photoinitiators, and other additives.

In some embodiments, the crosslinking agent is glycerine, trimethylolpropane, diethanolamine, triethanolamine, or mixtures thereof.

In some embodiments, further oligomers include, for instance, polyethers, polyesters, polycarbonates, polyacrylates, and copolymers thereof. The further oligomers may comprise one or more (e.g. two or more) hydroxy groups, comprise one or more (e.g. two or more) ethylenically unsaturated groups, and/or comprise one or more (e.g. two or more) epoxy groups. In one embodiment, the present compositions comprise, relative to the total weight of the composition, 0-60 wt % of further oligomers, e.g. 5-40 wt %.

In some embodiments, the light and UV stabilizers include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis($\alpha,\alpha$-dimethylbenzyl)phenyl]-2H-benzotriazole, 2,2'-methylenebis(4-cumyl-6-benzotriazolephenyl), 2,2'-p-phenylenebis(1,3-benzoxazin-4-one), amine light stabilizers (HALS) and mixtures thereof.

In some embodiments, the inorganic filler comprises a silicate mineral, metal oxide, metal salt, clay, metal silicate, glass fiber, natural fibrous material, synthetic fibrous mineral, or mixtures thereof.

In some embodiments, the organic filler comprises carbon black, fullerene, carbon nanotubes, biochar, melamine colophony, cellulose fibers, polyamide fibers, polyacrylonitrile fibers, polyurethane fibers, polyester fibers based on aromatic and/or aliphatic dicarboxylic acid esters, carbon fibers, or mixtures thereof.

In some embodiments, the fillers are present in 0.5-30 percent by weight of the composition.

In some embodiments, the flame retardant is an organic phosphate, metal polyphosphate, metal oxide, metal salt, cyanuric acid derivative, or mixtures thereof.

In some embodiments, flame retardant is present in in 10 to 35 percent by weight of the composition.

In some embodiments, the dispersant comprises styrene, an acrylic ester, a di- and tri-acrylate/methacrylate, an ester acrylate/methacrylate, urethane or urea acrylate/methacrylate, or mixtures thereof.

Examples of reactive diluents that may be added to the resin compositions include monofunctional monomers and polyfunctional monomers. Examples of monofunctional monomers include monomers containing a vinyl group, such as N-vinyl pyrrolidone, N-vinyl caprolactam, vinyl imidazole, vinyl pyridine; isobornyl(meth)acrylate, bornyl(meth)acrylate, tricyclodecanyl(meth)acrylate, dicyclopentanyl (meth)acrylate, dicyclopentenyl(meth)acrylate, cyclohexyl (meth)acrylate, benzyl(meth)acrylate, 4-butylcyclohexyl (meth)acrylate, acryloyl morpholine, 2-hydroxyethyl(meth) acrylate, 2-hydroxypropyl(meth)acrylate, 2-hydroxybutyl (meth)acrylate, methyl(meth)acrylate, ethyl(meth)acrylate, propyl(meth)acrylate, isopropyl (meth)acrylate, butyl(meth) acrylate, amyl(meth)acrylate, isobutyl(meth)acrylate, t-butyl(meth)acrylate, pentyl(meth)acrylate, caprolactone acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl (meth)acrylate, isodecyl(meth)acrylate, undecyl(meth) acrylate, dodecyl(meth)acrylate, lauryl(meth)acrylate, stearyl(meth)acrylate, isostearyl(meth)acrylate, tetrahydrofurfuryl(meth)acrylate, butoxyethyl(meth)acrylate, ethoxydiethylene glycol (meth)acrylate, benzyl(meth)acrylate, phenoxyethyl(meth)acrylate, polyethylene glycol mono (meth)acrylate, polypropylene glycol mono(meth)acrylate, methoxyethylene glycol (meth)acrylate, ethoxyethyl(meth) acrylate, methoxypolyethylene glycol (meth)acrylate, methoxypolypropylene glycol (meth)acrylate, diacetone (meth)acrylamide, isobutoxymethyl(meth)acrylamide, N,N-dimethyl (meth)acrylamide, t-octyl(meth)acrylamide, dimethylaminoethyl(meth)acrylate, diethylaminoethyl(meth) acrylate, 7-amino-3,7-dimethyloctyl(meth)acrylate, N,N-diethyl (meth)acrylamide, N,N-dimethylaminopropyl(meth) acrylamide, hydroxybutyl vinyl ether, lauryl vinyl ether, cetyl vinyl ether, 2-ethylhexyl vinyl ether; and compounds represented by the following formula (2) $CH_2C(R^6)$—COO$(R^7O)_m$—$R^8$ (2) wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group comprising alkyl group with 4-20 carbon atoms, optionally substituted with alkyl groups with 1-2 carbon atoms; or $R^8$ is a dioxane group-comprising alkyl group with 4-20 carbon atoms, optionally substituted with methyl groups; or $R^8$ is an aromatic group, optionally substituted with $C_1$-$C_{12}$ alkyl group, preferably a $C_8$-$C_9$ alkyl group, and alkoxylated aliphatic monofunctional monomers, such as ethoxylated isodecyl (meth)acrylate, ethoxylated lauryl(meth)acrylate, and the like.

Examples of polyfunctional monomers include monomers containing two or more (meth)acrylate groups such as trimethylolpropane tri(meth)acrylate, pentaerythritol (meth) acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neo-pentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecane diyl dimethyl di(meth) acrylate, and di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy(meth) acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

In one embodiment, the compositions comprise, relative to the total weight of the composition, up to 10 wt % of one or more reactive diluents, e.g. up to 20 wt % or up to 30 wt %. The compositions generally comprise less than 90 wt % of one or more reactive diluents, e.g. less than 75 wt % or less than 50 wt %.

Examples of free radical photo initiators include diphenyl (2,4,6-trimethylbenzoyl)phosphine oxide, benzophenones (e.g. benzophenone, alkyl-substituted benzophenone, or alkoxy-substituted benzophenone); benzoins, e.g. benzoin, benzoin ethers, such as benzoin methyl ether, benzoin ethyl ether, and benzoin isopropyl ether, benzoin phenyl ether, and benzoin acetate; acetophenones, such as acetophenone, 2,2-dimethoxyacetophenone, 4-(phenylthio)acetophenone, and 1,1-dichloroacetophenone; benzil, benzil ketals, such as benzil dimethyl ketal, and benzil diethyl ketal; anthraquinones, such as 2-methylanthraquinone, 2-ethylanthraquinone, 2-tert-butylanthraquinone, 1-chloroanthraquinone, and 2-amylanthraquinone; triphenylphosphine; benzoylphosphine oxides, such as, for example, 2,4,6-trimethylbenzoyldiphenylphosphine oxide; thioxanthones and xanthones, acridine derivatives, phenazene derivatives, quinoxaline derivatives or 1-phenyl-1,2-propanedione-2-O-benzoyloxime, 1-aminophenyl ketones or 1-hydroxyphenyl ketones, such as 1-hydroxycyclohexyl phenyl ketone, phenyl(1-hydroxyisopropyl)ketone and 4-isopropylphenyl(1-hydroxyisopropyl)ketone, or triazine compounds, for example, 4'-methyl thiophenyl-1-di(trichloromethyl)-3,5-S-triazine, S-triazine-2-(stilbene)-4,6-bis(trichloromethyl), and paramethoxy styryl triazine. Free radical photoinitiators are particularly useful if the composition comprises ethylenically unsaturated components, for instance acrylates or methacrylates. In one embodiment, the compositions comprise, relative to the total weight of the composition, 0-10 wt % of one or more free radical photoinitiators, e.g. 0.5-7.5 wt %.

Examples of cationic photoinitiators include, for instance, onium salts with anions of weak nucleophilicity. Examples include halonium salts, iodosyl salts or sulfonium salts, such as are described in published European patent application EP 153904 and WO 98/28663, sulfoxonium salts, such as described, for example, in published European patent applications EP 35969, 44274, 54509, and 164314, or diazonium salts, such as described, for example, in U.S. Pat. Nos. 3,708,296 and 5,002,856.

Additional examples of additives include antioxidants, dyes, wetting agents, anti-foaming agents, thickening agents, photosensitizers, solvents (for example, in amounts less than 20 wt %, e.g. less than 10 wt %, less than 5 wt %, or about 0 wt %), and metallic-, organic-, inorganic-, or organic/inorganic hybrid fillers (e.g. silica particles, glass beads, or talc). The size of the fillers may vary and can be, for instance, in the nanometer range or in the micrometer range. In one embodiment, the present compositions comprise, relative to the total weight of the composition, less than 20 wt % of fillers, e.g. less than 10 wt %, less than 5 wt %, or about 0 wt %.

Additional additives include colorants such as titanium dioxide, carbon black, iron oxide pigments, or organic pigments.

In order to improve the storage stability, the photopolymerizable resin composition may contain a small amount of a polymerization inhibitor. The polymerization inhibitor may be, for example, methyl hydroquinone, hydroquinone, 2,2-methylene-bis(4-methyl-6-tertiary-butylphenol), catechol, hydroquinone monomethyl ether, monotertiary butyl hydroquinone, 2,5-ditertiary-butyl hydroquinone, p-benzoquinone, 2,5-diphenyl-p-benzoquinone, 2,5-ditertiary-butyl-p-benzoquinone, picric acid, citric acid, phenothiazine, tertiary-butyl catechol, 2-butyl-4-hydroxyanisole or 2,6-ditertiary-butyl-p-cresol. The amount of the polymerization inhibitor may be from 0.001 to 3 parts by mass.

Methods of Making

In some embodiments, the photopolymerizable resins are made by a process that comprises reacting together the following:
(a) a polyester comprising at least one nitro-substituted polyester diol, and
(b) at least one polyisocyanate, and reacting with
(c) at least one amino- or hydroxy-substituted photopolymerizable group.

Scheme 3 depicts a typical synthesis:

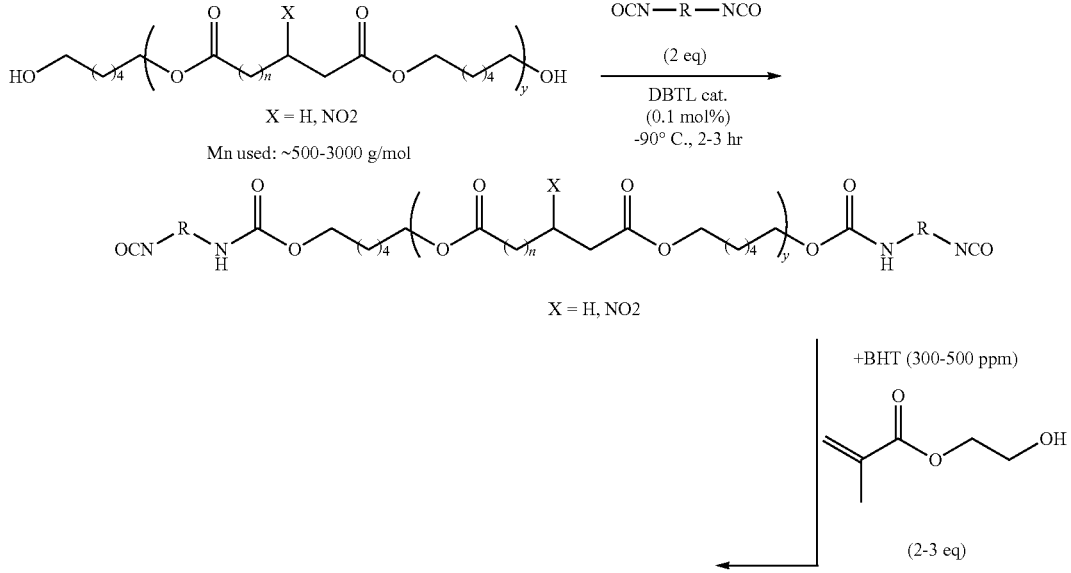

-continued

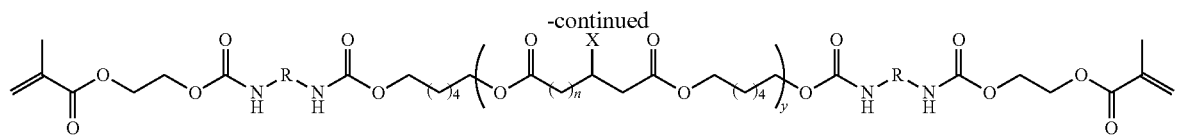

In some embodiments, in the first step, the reaction conditions comprise a temperature of 25 to 100° C. optionally in the presence of a suitable catalyst such as dibutyltin dilaurate (DBTDL). In some embodiments, the reacting is carried out in the presence of a suitable organic solvent. The resulting urethane is then reacted with a hydroxy-substituted acrylate ester, optionally in the presence of a free radical inhibitor such as BHT, to give the photopolymeric resin.

In some embodiments, the order of addition of reagents is reversed such that in the first step, the reaction conditions comprise a temperature of 25 to 100° C. optionally in the presence of a suitable catalyst such as dibutyltin dilaurate (DBTDL) wherein diisocyanate is reacted with a stoichiometric amount of hydroxy-substituted (meth)acrylate ester, optionally in the presence of a free radical inhibitor such as BHT. The resulting product mixture is then reacted in a second step with a polyesterol to provide polyester urethane (meth)acrylate oligomer product.

In some embodiments, the polyester comprising at least one nitro-substituted polyester diol further comprises at least one polyester diol not comprising a nitro group. In other embodiments, the polyesterols not substituted by a nitro group may be derived from other recycled plastic waste to produce a broader range of mechanical properties. For example, polyesterols derived from glycolysis of polyethylene terephthalate (PET) produces more rigid oligomers suitable for photopolymer resins that produce higher modulus cured products than those derived from the tough and flexible aliphatic polyesterols from nitro-containing DCAs and diols. Thus, the invention also contemplates compositions comprising polyesterols made from dicarboxylic acids substituted with a nitro group and dicarboxylic acids not substituted by a nitro group and derived from glycolysis of PET.

Applications

The photopolymerizable resins are useful in a wide variety of applications. In some embodiments, the compositions are useful for coatings and for use in rapid prototyping processes to make three-dimensional objects. Rapid prototyping involves the successive, imagewise curing of (thin) layers of a composition to build up a three-dimensional object. See, e.g., U.S. Pat. No. 5,972,563.

In some embodiments, the invention provides a method comprising treating the composition described herein with actinic radiation to give a cured product. In some embodiments, the actinic radiation is electron beams, X-rays, UV or visible light. In some embodiments, the actinic radiation is light with a wavelength range of 400-700 nm. In some embodiments, the actinic radiation is UV radiation.

The invention also provides a method of preparing a 3D product, comprising depositing successive layers according to a predetermined pattern of the composition of the invention. The composition may be deposited according to any method known in the art, including ink-jet printing, extrusion, and vat polymerization methods including stereolithography and digital light processing or similar. Once deposited, the 3D product may be cured with actinic radiation. The actinic radiation may be applied as the composition is deposited or afterwards. In some embodiments, the actinic radiation is electron beams, X-rays, UV or visible light. In some embodiments, the actinic radiation is light with a wavelength range of 400-700 nm. In some embodiments, the actinic radiation is UV radiation.

It should be understood that this invention is not limited to the particular methodologies, protocols, and reagents, etc., described herein and as such can vary therefrom. The terminology used herein is for the purpose of describing particular embodiments only, and is not intended to limit the scope of the present invention, which is defined solely by the claims.

EXAMPLES

The invention is further illustrated by the following examples which are intended to be purely exemplary of the invention, and which should not be construed as limiting the invention in any way. The following examples are illustrative only, and are not intended to limit, in any manner, any of the aspects described herein. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

General Materials and Methods

Dicarboxylic acids (DCAs) employed in polyester diol synthesis were obtained from the ATOD™ of polyethylene plastic and consist of a mixture of linear aliphatic DCAs with carbon numbers ranging from 4-24 carbons. The mixture also contains DCAs bearing one or more nitro functional groups along the aliphatic linker. Average DCA molecular weights for the purposes of chemical synthesis were determined by titration with aqueous sodium hydroxide with phenolphthalein as indicator (acid number determination). Other reagents and equipment were obtained from commercial sources and used as received, unless otherwise indicated.

Nitro-Polyester Diol Synthesis

Nitro-substituted polyester diols were synthesized according to the following general procedure and as represented in Scheme 1: dicarboxylic acid mixture was combined with diol (e.g. 1,6-hexanediol) and a catalytic amount of concentrated sulfuric acid or other suitable catalyst; catalyst loading varied between 0.2 mole percent (mol %) to 4 mol %. The mixture was heated while stirring in a pre-warmed oil bath at 100-110° C. for 2-4 hours under atmospheric pressure, followed by application of reduced pressure (≤19 mbar) for 1-2 hours. The product was cooled under vacuum, and characterized by ATR-FTIR analysis and end group titration (total acid number and hydroxyl number). Titrations were performed using Test Method A according to ASTM D-4274-99 with slight modifications, and results were used to calculate approximate polyester diol molecular weight. Polyester diols stored outside of a desiccator for prolonged periods were dried prior to use by overnight incubation in a vacuum oven at 80° C., or by bubbling dry inert gas (e.g. argon) through the polyol at ≥100° C. while simultaneous applying vacuum for 1 hour, followed by storage in an ambient pressure desiccator. Specific and non-limiting examples of polyester diols synthesized containing recycled content are presented below:

Example 1

Dicarboxylic acid (DCA) mixture obtained from ATOD™ of polyethylene waste having an average molecular weight of 178.14 g/mol (23.517 grams, 0.5869 molar equivalents) was combined with 1,6-hexanediol (26.581 grams, 1 molar equivalent) and sulfuric acid catalyst (0.131 grams, 1 mole % relative to DCA mix) at room temperature in a round bottom flask containing a Teflon-coated magnetic stir bar. The mixture was heated to 105° C. open to air for 4 hours with stirring, at which point heating and stirring of the reaction melt was continued under applied vacuum (≤19 mbar) for 2 more hours. The reaction mixture was cooled under vacuum and stored in a desiccator. The nitro-containing polyester diol product (PE-1) was characterized by attenuated total reflectance Fourier transform infrared spectroscopy (ATR-FTIR), $^1$H NMR, gel permeation chromatography (GPC) and end-group titration (total acid number, and hydroxyl number determination by the acetylation method, Test Method A according to ASTM D-4274-99). The acid number was measured as 4.6±0.3 mg KOH/g sample, the hydroxyl number was 183±9 mg KOH/g sample, the number average molecular weight was determined to be 614±30 g/mol by titration.

Example 2

ATOD™ DCA mixture (42.803 grams, 0.901 molar equivalents) was combined with 1,6-hexanediol (31.513 grams, 1 molar equivalent) and concentrated sulfuric acid (98%, 0.229 grams, 1 mole % relative to DCA mix) in a round bottom flask with a Teflon-coated magnetic stir bar. The mixture was heated at 105° C. open to air to produce a homogeneous melt for 4 hours, followed by application of vacuum (≤19 mbar) with continued heating for 2 additional hours. The product was cooled under vacuum and stored in an ambient pressure desiccator. The nitro-containing polyester diol product PE-2 was characterized by ATR-FTIR, GPC, and end-group titration as in Example 1. The acid number was 6.3±0.6 mg KOH/g, the hydroxyl number was 37.4±8.1 mg KOH/g, the number average molecular weight was 2615 g/mol by titration.

Further non-limiting examples of nitro-substituted polyester diols ($NO_2$-PE) prepared by the methods described above are shown in Table 1.

TABLE 1

| Sample | Acid Number (mg KOH/g) | Hydroxyl Number (mg KOH/g) | Molecular Weight (g/mol) | Amount of 1,6-hexanediol (molar equivalents) | Amount of DCA mixture (molar equivalents) | $H_2SO_4$ (mol % relative to DCA) |
|---|---|---|---|---|---|---|
| PE-1 | 4.6 ± 0.3 | 183 ± 9 | 614 | 1 | 0.5869 | 1 |
| PE-2 | 6.3 ± 0.6 | 37.4 ± 8.1 | 2615 | 1 | 0.901 | 1 |
| PE-3 | 7.9 ± 0.8 | 144 ± 21 | 740 | 1 | 0.777 | 1.4 |
| PE-4 | 10.8 ± 1.6 | 62.6 ± 9.6 | 1528 | 1 | 0.924 | 0.7 |
| PE-5 | 8.5 ± 0.1 | 91.6 ± 0.6 | 1121 | 1 | 0.9237 | 3.9 |
| PE-6 | 12 | 177 | 593 | 1 | 0.5750 | 1 |
| PE-7 | — | 196 ± 2 | 572 | 1 | 0.599 | ~4 |
| PE-8 | 8.2 ± 0.6 | 131 ± 3 | 809 | 1 | 0.6828 | 1 |
| PE-9 | 8.43 ± 0.08 | 112 ± 6 | 937 | 1 | 0.6663 | 1 |

Note: Polyol was synthesized with 1 mole % of p-toluenesulfonic acid instead of $H_2SO_4$.

Nitro-substituted polyester diols may optionally be synthesized from the corresponding dimethyl esters of DCAs obtained from ATOD™ of polyethylene plastic waste, as depicted in Scheme 2 and described in Examples 3 and 4.

Example 3

A nitro-substituted polyester diol containing aromatic co-monomer was prepared using the following protocol. Terephthalic acid (3.003 grams, 0.144 molar equivalents) was combined with 1,6-hexanediol (14.806 grams, 1 molar equivalent) and concentrated sulfuric acid (0.088 g, 1 mole % relative to total diacid mix used in both steps) in a 100 mL round bottom flask equipped with a PTFE-coated magnetic stir bar and a 14 cm long glass air condenser. The flask was heated at 145-150° C. for 1.5 hours while stirring open to air. The mixture was then cooled to 105° C., the air condenser was removed, and ATOD™ DCA mixture with an average molecular weight of 174.17 g/mol (12.5 grams, 0.573 molar equivalents) was added to the reaction flask. The resulting mixture was heated while stirring in air at 105° C. for 2 hours. Vacuum was then applied (≤19 mbar) for 1 hour with continued heating. The nitro-substituted and partially aromatic polyesterol product was characterized by ATR-FTIR, GPC, and end-group titration as in Example 1. The acid number was 6.4±0.8 mg KOH/g, the hydroxyl number was 87.2±3.8 mg KOH/g, the number average molecular weight was 1201 g/mol by titration. PDI was 3.1, measured by GPC.

Example 4 (Ref: RP1-139A)

The starting diester mix is estimated to have an average molecular weight of 177 g/mol. A reactor is charged with 100 parts by mass of the diester mix and 107 parts by mass of 1,6-hexanediol and heated to 120° C. To this mixture are added 6 parts of a 10 wt % solution of dibutyl tin(IV) dilaurate in heptane. The solution is stirred and allowed to react at 120° C. for 17 hours, allowing heptane and evolved methanol to evaporate out of the reactor. The reaction is then cooled to give 146 parts by weight isolated of the product as a clear yellow liquid. GPC analysis in TH vs polystyrene standards indicate Mn 600, PDI 3.49.

Example 5 (Ref: RP1-139D)

The starting diester mix is estimated to have an average molecular weight of 177 g/mol. A reactor is charged with 100 parts by mass of the diester mix and 72 parts by mass of 1,6-hexanediol and heated to 120° C. To this mixture are added 5.5 parts of a 10 wt % solution of dibutyl tin(IV) dilaurate in heptane. The solution is stirred and allowed to react at 120° C. for 17 hours, allowing heptane and evolved methanol to evaporate out of the reactor. The reaction is then cooled to give 119 parts by weight isolated of the product as a clear yellow liquid. GPC analysis in TH vs polystyrene standards indicate Mn 3200, PDI 2.13.

Example 6

Polyester urethane (meth)acrylate (PEUA) oligomers containing nitro-modified polyesterols made in part from post-consumer recycled waste were synthesized according to the following general 2-step-1-pot procedure, depicted schematically in Scheme 3: A dry vessel (flask or scintillation vial) was charged with polyesterol (1 molar equivalent) at room temperature, followed by addition of a diisocyanate (2 molar equivalents scaled to the hydroxyl content of the polyesterol) in a single portion. This addition was performed at room temperature for all liquid diisocyanates used, and at ~50° C. for methylene diphenyl diisocyanate (MDI). Liquid diisocyanates were selected from but not limited to materials such as hexamethylene diisocyanate (HMDI), isophorone diisocyanate (IPDI), and toluene diisocyanate (TDI). After mixing, dibutyltin dilaurate (DBTDL) catalyst was added (0.1 mol % relative to diisocyanate, and the viscous homogeneous mixtures were mixed for 5 minutes at room temperature, followed by heating at 60-90° C. with continued mixing for 2-3 hours. Mixing was performed by constant mechanical stirring.

Following this first step, the reaction mixture was cooled to 40° C. and butylated hydroxytoluene (BHT) was added (300-500 ppm of the current reaction mass, e.g. 0.3-0.5 mg/g) to prevent gelation of the reaction mixture during end-capping with 2-hydroxyethyl methacrylate (HEMA). After thorough mixing, HEMA was added (2-2.9 eq) and the mixture was stirred constantly at 40° C. for 2-6 hours, monitoring the disappearance of the isocyanate (NCO) stretch at ~2260 cm$^{-1}$ in ATR-FTIR as the reaction proceeds. The viscosity of the reaction increases during this second step of the reaction. Oligomer products were stored at 4-22° C. under air until use in photopolymer resin formulations.

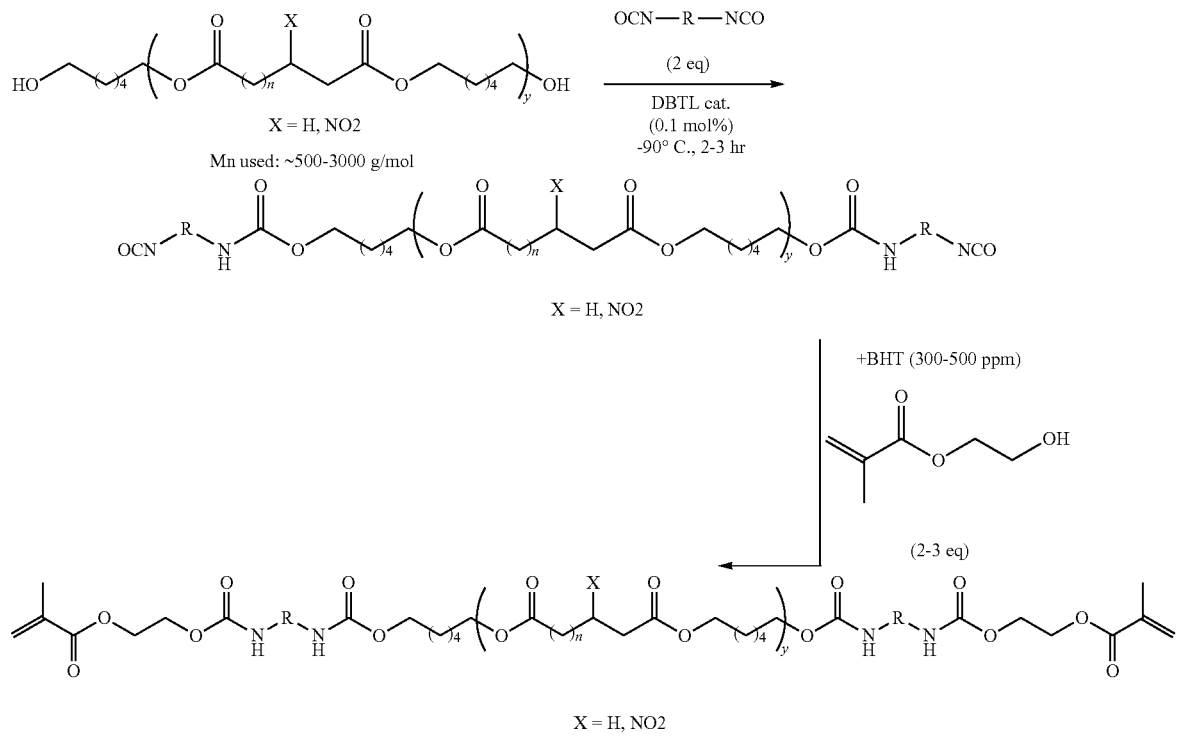

Scheme 3. Representative synthesis of polyester urethane acrylate oligomers for photopolymer resins.

Example 7

Polyesterol PE-7 (46.2 grams, 1 equivalent) was combined with toluene diisocyanate (TDI, 28.133, 2 equivalents) in one portion at room temperature in a dry 2-necked round bottom flask fitted with a mechanical stirrer). The mixture was stirred at room temperature for 5 minutes while immersed in an oil bath. Dibutyltin dilaurate (DBTDL, 0.1 mole percent relative to diisocyanate content, 0.096 mL) was added while stirring. The oil bath temperature was then gradually increased to 60° C. over ~15 minutes and stirring was continued for 2 hours. Butylated hydroxytoluene (BHT, 0.037 grams) was added, and the reaction temperature was reduced to 40° C. 2-Hydroxyethyl methacrylate (HEMA, 29.432 grams, 2.8 equivalents) was added by pipet while stirring constantly, and the reaction was continued in the dark for 2 hours, followed by overnight incubation at room temperature (20° C.) before pouring the oligomer into a dark bottle to provide 100.6 grams of a viscous amber-colored product. The oligomer was characterized by ATR-FTIR which confirmed the consumption of the isocyanate functionality, and the presence of methacrylate alkene, and urethane linkages.

Example 8

Polyesterol PE-1 (43.73 grams, 1 equivalent) was combined with isophorone diisocyanate (IPDI, 31.665, 2 equivalents) in one portion at room temperature in a dry round bottom flask fitted with a mechanical stirrer). The mixture was stirred at room temperature for 5 minutes while immersed in an oil bath. Dibutyltin dilaurate (DBTDL, 0.1 mole percent relative to diisocyanate content, 0.084 mL) was added while stirring. The oil bath temperature was then increased to 80° C. and stirring was continued for 2 hours. Butylated hydroxytoluene (BHT, 0.037 grams) was added, and the reaction temperature was reduced to 40° C. 2-Hydroxyethyl methacrylate (HEMA, 26.879 grams, 2.9 equivalents) was added by pipet while stirring constantly, and the reaction was continued in the dark for 2.5 hours, followed by overnight incubation at room temperature (20° C.), and 2 more hours at 40 40° C. to provide 101.4 grams of a viscous amber-colored product. The consumption of isocyanate functionality was monitored by ATR-FTIR spectroscopy. The oligomer product was characterized by ATR-FTIR which confirmed the consumption of the isocyanate functionality, and the presence of methacrylate alkene, and urethane linkages.

Example 9

Polyesterol PE-2 (58.742 grams, 1 equivalent) was combined with IPDI (8.490 grams, 2 equivalents) at room temperature in a round bottom flask equipped with a mechanical stirrer. After stirring vigorously at room temperature for 5 minutes, dibutyltin dilaurate (0.023 mL, 0.1 mol % relative to diisocyanate content) was added in one portion and the reaction mixture was brought to 80° C. over 15 minutes with constant stirring. After 3 hours, BHT (0.034 grams) was added, and the reaction temperature was reduced to 40° C. over 0.5 hours. 2-Hydroxyethyl methacrylate (HEMA, 7.904 grams, 3.1 equivalents) was added and stirring was continued at 40° C. for 12 hours, with periodic monitoring of isocyanate consumption by ATR-FTIR. A yellow-amber-colored viscous oligomer was obtained (74.295 grams). The oligomer was characterized by ATR-FTIR spectroscopy prior to use in photopolymer resin formulations.

Example 10

Methacrylated blocked polyurethane oligomers (BPEUA) suitable for 2-stage cure photopolymer resins were synthesized as described for PEUA oligomers with slight modification in the end-capping procedure. The general 2-step-1-pot synthetic procedure, as depicted in Scheme 4, is as follows: A dry vessel (flask or scintillation vial) was charged with polyesterol (1 equivalent) at room temperature, followed by addition of a diisocyanate (2 equivalents) in a single portion. This addition was performed at room temperature for all liquid diisocyanates used, and at ~50° C. for methylene diphenyl diisocyanate (MDI). Liquid diisocyanates used were hexamethylene diisocyanate (HMDI), isophorone diisocyanate (IPDI), and toluene diisocyanate (TDI). After mixing, dibutyltin dilaurate (DBTDL) catalyst was added (0.1 mol % relative to diisocyanate), and the homogeneous mixtures were mixed for 5 minutes at room temperature, followed by heating at 60-90° C. with continued mixing for 2-3 hours. Mixing was performed with mechanical stirring. The reaction mixture was then cooled to 40° C. and butylated hydroxytoluene (BHT) was added (300-500 ppm of the current reaction mass, e.g. 0.3-0.5 mg/g) to prevent gelation of the reaction mixture during end capping with 2-(tert-butylamino)ethyl methacrylate (TBAEMA). TBAEMA was added (2-2.1 equivalents) and the mixture was stirred at 40-50° C. for 1-6 hours, monitoring the disappearance of the isocyanate (NCO) stretch at ~2260 $cm^{-1}$ as the reaction proceeds. The viscosity of the reaction increases during this second step of the reaction. Oligomer products were stored at 4° C. until use in photopolymer resin formulations. Representative specific and non-limiting examples of methacrylate blocked polyester urethane oligomers synthesized from polyesterols containing recycled content are presented below.

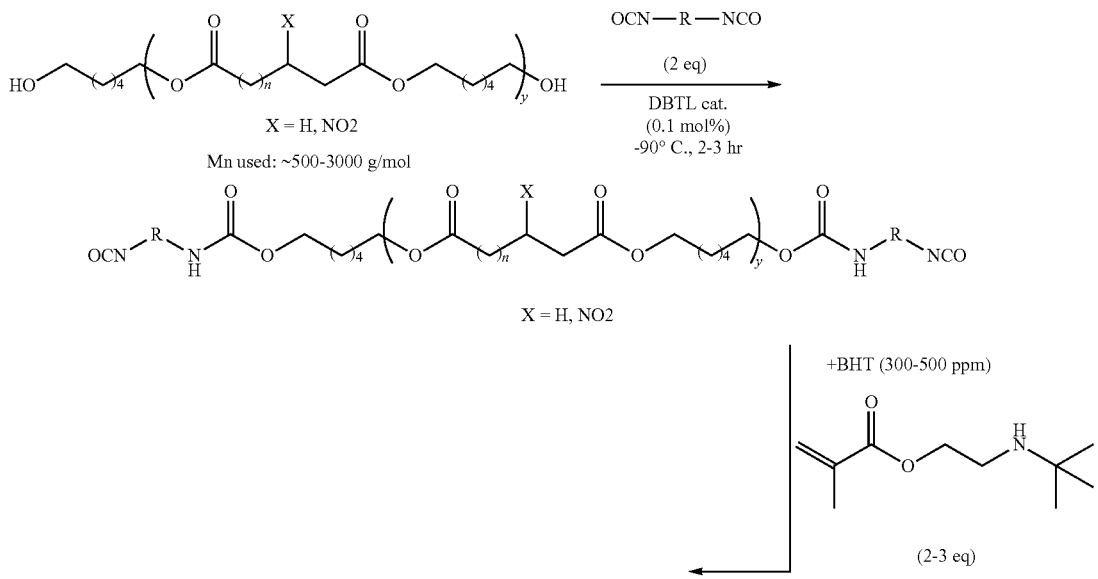

Scheme 4. Representative synthesis of methacrylated blocked polyurethane oligomers.

-continued

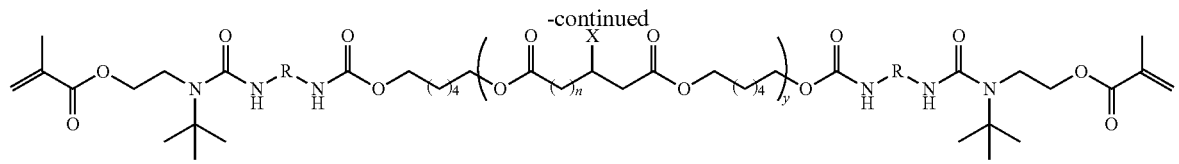

X = H, NO2

Example 11

Polyesterol PE-4 (0.733 grams, 1 equivalent) was combined with toluene diisocyanate (0.167 grams, 2 equivalents) at room temperature in a scintillation vial. After stirring vigorously at room temperature for 5 minutes, dibutyltin dilaurate (0.001 mL) was added in one portion and the reaction mixture was brought to 90° C. with stirring. After 1.5 hours, BHT (0.005 grams) was added, and the reaction temperature was reduced to 40° C. Then, 2-(tert-butylamino) ethyl methacrylate (TBAEMA, 0.180 grams, 2.02 equivalents) was added and stirring was continued at 40° C. for 1 hour, with periodic monitoring of isocyanate consumption by ATR-FTIR. An amber-colored viscous oligomer BPEUA-7 was obtained (1.044 grams). The oligomer was characterized by ATR-FTIR spectroscopy prior to use in photopolymer resin formulations.

Example 12

Polyesterol PE-4 (0.821 grams, 1 equivalent) was combined with hexamethylene diisocyanate (0.181 grams, 2 equivalents) at room temperature in a scintillation vial. After stirring vigorously at room temperature for 5 minutes, dibutyltin dilaurate (0.001 mL) was added in one portion and the reaction mixture was brought to 90° C. with stirring. After 1.5 hours, BHT (0.005 grams) was added, and the reaction temperature was reduced to 40° C. Then, 2-(tert-butylamino)ethyl methacrylate (TBAEMA, 0.201 grams, 2.02 equivalents) was added and stirring was continued at 40° C. for 1 hour, with periodic monitoring of isocyanate consumption by ATR-FTIR. An amber-colored viscous oligomer BPEUA-8 was obtained (1.170 grams). The oligomer was characterized by ATR-FTIR spectroscopy prior to use in photopolymer resin formulations.

PEUA and BPEUA oligomer compositions synthesized according to the approach described above are summarized in Table 2.

TABLE 2

PEUA and BPEUA oligomers synthesized for trial formulations.

| SAMPLE | 1-STAGE OR 2-STAGE CURABLE | POLYOL USED | DIISOCYANATE USED |
|---|---|---|---|
| PEUA-1 | 1 | PE-7 | TDI |
| PEUA-2 | 1 | PE-1 | IPDI |
| PEUA-3 | 1 | PE-2 | IPDI |
| PEUA-4 | 1 | PE-4 | HMDI |
| PEUA-5 | 1 | PE-6 | TDI |
| PEUA-6 | 1 | PE-6 | HMDI |
| PEUA-7 | 1 | PE-5 | HMDI |
| PEUA-8 | 1 | PE-6 | IPDI |
| PEUA-9 | 1 | PE-5 | IPDI |
| BPEUA-1 | 2 | PE-3 | IPDI |
| BPEUA-2 | 2 | PE-3 | HMDI |
| BPEUA-3 | 2 | PE-6 | HMDI |
| BPEUA-4 | 2 | PE-3 | MDI |
| BPEUA-5 | 2 | PE-3 | IPDI |
| BPEUA-6 | 2 | PE-4 | MDI |
| BPEUA-7 | 2 | PE-4 | TDI |
| BPEUA-8 | 2 | PE-4 | HMDI |
| BPEUA-9 | 2 | PE-4 | IPDI |

Example 13

A photopolymerizable polyester methacrylate was generated by acid-catalyzed esterification of polyesterol with methacrylic acid. A 2-neck 100 mL round bottom flask equipped with a PTFE-coated magnetic stir bar and air inlet was loaded with PE-8 (23.094 grams, 1 molar equivalent of OH functionality), methacrylic acid (4.846 grams, 1.05 molar equivalents relative to OH groups), butylated hydroxytoluene (0.028 grams, 1000 ppm relative to input mass), p-toluenesulfonic acid monohydrate (0.107 grams, 1 mole % relative to methacrylic acid), and toluene (4.86 mL, ~15 weight % of input reagents). The flask was topped with a Dean-Stark apparatus equipped with a reflux condenser, and the mixture was heated and stirred in a preheated oil bath at 110-120° C. while bubbling air through the reaction mixture for 2.5 hours, at which point the volume of water collected in the Dean-Stark apparatus was close to the theoretical amount. The Dean-Stark apparatus was drained, and residual toluene was distilled out of the reaction over 0.5 hours. The reaction was cooled to room temperature, and the product was isolated as an amber-colored liquid (25.821 grams, 96% yield). The product was analyzed by ATR-FTIR, GPC, acid number titration, and hydroxyl number titration. The product had an acid number of 10.0±0.9 mg KOH/g, an OH number of 12.7±1.3 mg KOH/g (titration), Mn of 585 g/mol, Mw of 1986 g/mol, PDI of 3.39 (GPC).

Addition of diphenyl(2,4,6-trimethylbenzoyl)phosphine oxide (TPO) photoinitiator at 1.1 wt % produced a low viscosity resin. Approximately 0.2 mL of this resin were placed between two sheets of fluorinated ethylene propylene (FEP) and exposed to 400 nm light (~70 mW) for 1 minute to produce a solid flexible film.

Example 14

A polyester acrylate was generated by acid-catalyzed esterification of polyesterol PE-9 with acrylic acid. A 2-neck 100 mL round bottom flask equipped with a PTFE-coated magnetic stir bar and air inlet was loaded with PE-9 (17.976 grams, 1 molar equivalent of OH functionality), acrylic acid (2.705 grams, 1.05 molar equivalents relative to OH groups), butylated hydroxytoluene (0.021 grams, 1000 ppm relative to input mass), p-toluenesulfonic acid monohydrate (0.071 grams, 1 mole % relative to acrylic acid), and toluene (3.6 mL, ~15 weight % of input reagents). The flask was topped with a Dean-Stark apparatus equipped with a reflux condenser, and the mixture was heated and stirred in a preheated oil bath at 110-120° C. while bubbling air through the reaction mixture for 3.75 hours, at which point the volume of water collected in the Dean-Stark apparatus was close to the theoretical amount. The Dean-Stark apparatus was drained, and residual toluene was distilled out of the reaction over 0.75 hours. The reaction was cooled to room temperature, and the product was isolated as an amber-colored liquid (19.276 grams, 97% yield). The product was analyzed by ATR-FTIR, GPC, acid number titration, and hydroxyl number titration. The product had an acid number of 11.1±1.1 mg KOH/g, an OH number of 9.0±0.7 mg KOH/g (titration), Mn of 889 g/mol, Mw of 2592 g/mol, PDI of 2.92 (GPC).

Example 15

PEUA and BPEUA Oligomers were formulated into photopolymer resins by mixing with reactive diluents, photoinitiators and optional pigments/fillers. In the case of 2-stage cure resins from BPEUAs, a diamine chain extender was also added. Components were combined and mixed, preferably with a mechanical mixer equipped with either a 0.5 cm wide spatula blade or 2-5 cm wide anchor/mustache-type PTFE stir blade attachment. Mechanical mixing was performed for a sufficient amount of time to produce homogeneous blends. In general, resins were prepared with the following process: oligomer was weighed into the vial or flask, followed by addition of reactive diluent (liquid monovalent or divalent photopolymerizable monomers) and mixing to provide a homogeneous blend. For 1-stage cure resins form PEUAs, diphenyl(2,4,6-trimethylbenzoyl)phosphine oxide (TPO) photoinitiator was added, followed by thorough mixing to fully dissolve/disperse the initiator (5-30 minutes). For resins containing pigments, such as but not limited to carbon black or titanium dioxide, pigment was added to the resin and dispersed with mechanical stirring for 30 minutes. Resins intended for 3D printing were filtered through a 150 micrometer nylon mesh to remove any debris or residue that would interfere with the 3D printing process. In the case of 2-stage cure resins from BPEUAs, 4,4'-methylenebis(cyclohexylamine) chain extender (PACM) and TPO photoinitiator were added at the same time, followed by thorough mixing for 5-30 minutes to provide the fully formulated resin.

Examples of reactive diluents used include but are not limited to 2-ethylhexyl methacrylate (2-EHMA), isobornyl methacrylate (IBMA), diethylene glycol methyl ether methacrylate (DEGMEMA), diethyleneglycol dimethacrylate (DEGDMA), 2-hydroxyethyl methacrylate (HEMA), 2-hydroxyethyl acrylate (HEA), and 2-(((butylamino)carbonyl)oxy)ethyl acrylate (BACOEA). A single diamine chain extender was explored in 2-stage cure formulations, but this should not be considered a limitation on the identity of potential diamine or diol chain extenders applicable in 2-stage cured resins. Diphenyl(2,4,6-trimethylbenzoyl) phosphine oxide (TPO) photoinitiator was selected for its sensitivity at higher wavelengths (350-410 nm), and its lower degree of yellowing in cured photopolymer resins compared to other commonly employed phosphine oxide photoinitiators (e.g. phenylbis(2,4,6-trimethylbenzoyl)phosphine oxide). However, this invention is not restricted to this single photoinitiator. Chemical structures of components listed above are shown below.

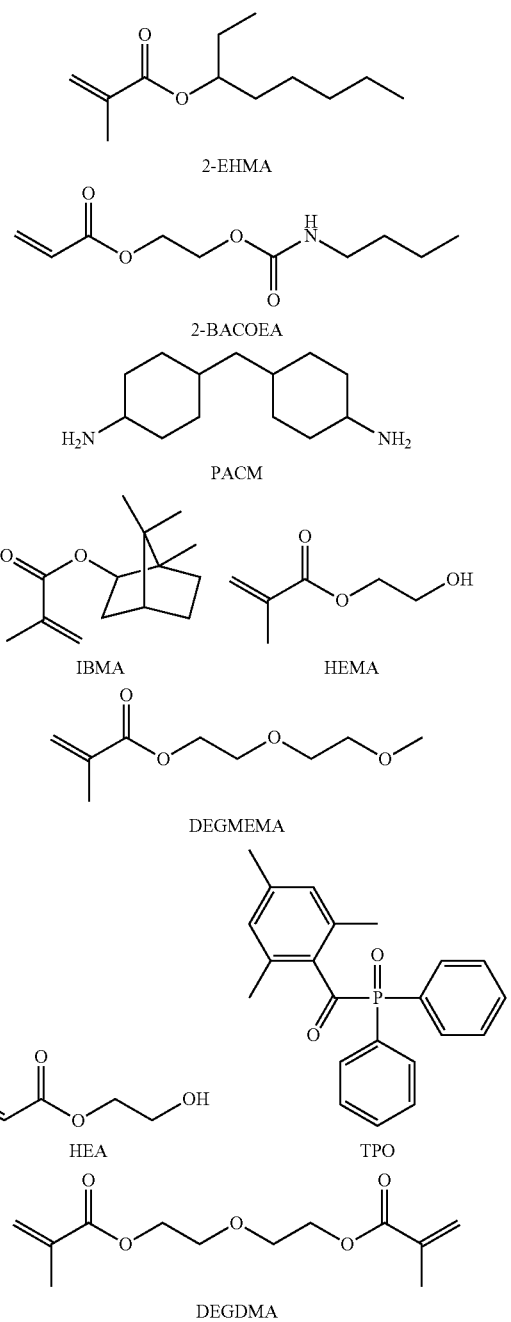

Specific but non-limiting examples of photopolymer resin formulations are presented below.

Example 16

Oligomer PEUA-3 (71.742 grams) was combined with 2-hydroxyethyl methacrylate (HEMA, 46.63 grams) by mechanical stirring at room temperature in the dark for 30 minutes. TPO photoinitiator (1.196 grams) was added, and the mixture was stirred for an additional 30 minutes. The resulting pale yellow-amber resin was filtered through a 150 micrometer nylon mesh into a dark plastic bottle and stored at room temperature in the presence of air.

Example 17

Oligomer PEUA-1 (50.208 grams) was combined with 2-hydroxyethyl methacrylate (HEMA, 24.321 grams) at room temperature with mechanical mixing to provide a homogeneous viscous orange liquid. TPO photoinitiator (0.753 grams) was added and mixing was continued for 30 minutes in the dark. The resulting resin was filtered through a 150 micrometer nylon mesh into a dark storage bottle and stored at room temperature in the presence of air.

Example 18

Oligomer PEUA-2 (101.4 grams) was combined with 2-ethylhexyl methacrylate (2-EHMA, 49.1 grams) by mechanical stirring at room temperature in the dark for 30 minutes. TPO photoinitiator (1.52 grams) was added, and the mixture was stirred for an additional 30 minutes. The resulting pale yellow-amber resin was filtered through a 150 micrometer nylon mesh into a dark plastic bottle and stored at room temperature in the presence of air.

Example 19

Oligomer BPEUA-9 (0.365 grams) was combined with 2-EHMA (0.043 mg) and isobornyl methacrylate (IBMA, 0.063 grams) to produce a viscous amber liquid. Chain extender (PACM, 0.027 mg) and TPO photoinitiator (0.003 mg) were added and mixed to produce a viscous amber liquid (0.501 grams). The material was stored in an amber glass vial at 4° C.

The composition of non-limiting example photopolymer resins prepared are summarized in Table 3. Resins marked with a * were of a sufficiently low viscosity and were prepared at sufficient scale to print tensile testing specimens on a commercially available photopolymer 3D printer (ELEGOO Mars UV-LCD printer).

TABLE 3

Photopolymer resins formulated from PEUA and BPEUA oligomers

| Sample | Oligomer (wt %) | Reactive Diluent (wt %) | PACM wt % | TPO wt % | Filler (wt %) | 1- or 2- Stage Curable |
|---|---|---|---|---|---|---|
| R-1 | BPEUA-6 (52.6) | IBMA (39.5) | 7.2 | 0.7 | — | 2 |
| R-2 | BPEUA-7 (52.6) | IBMA (39.5) | 7.2 | 0.7 | — | 2 |
| R-3 | BPEUA-7 (61.5) | IBMA (30.8) | 6.9 | 0.8 | — | 2 |
| R-4 | BPEUA-8 (61.5) | IBMA (30.8) | 6.9 | 0.8 | — | 2 |
| R-5 | BPEUA-8 (72.8) | 2-EHMA (8.5) IBMA (12.7) | 5.5 | 0.5 | — | 2 |
| R-6 | BPEUA-9 (72.9) | 2-EHMA (8.5) IBMA (12.7) | 5.4 | 0.5 | — | 2 |
| R-7 | PEUA-4 (77.6) | 2-EHMA (21.8) | — | 0.5 | — | 1 |
| R-8 | BPEUA-9 (72.2) | 2-EHMA (22.0) | 5.3 | 0.5 | — | 2 |
| R-9 | BPEUA-9 (61.5) | IBMA (30.9) | 6.8 | 0.8 | — | 2 |
| R-10 | PEUA-4 (56.9) | IBMA (42.7) | — | 0.4 | — | 1 |
| R-11 | PEUA-6 (54.0) | IBMA (13.1) DEGMEMA (30.8) DEGDMA (1.6) | — | 0.5 | — | 1 |
| R-12 | PEUA-5 (65.7) | IBMA (16.5) DEGMEMA (17.4) | — | 0.4 | — | 1 |
| R-13 | PEUA-4 (49.9) | IBMA (19.8) DEGMEMA (22.3) HEMA (7.5) | — | 0.5 | — | 1 |
| R-14 | PEUA-8 (66.5) | 2-EHMA (33.1) | — | 0.4 | — | 1 |
| R-15 | PEUA-8 (66.0) | 2-EHMA (32.0) | — | 0.1 | Charcoal (0.5) | 1 |
| R-16 | PEUA-8 (65.8) | 2-EHMA (32.3) | — | 0.9 | SiO2 (1.0) | 1 |
| R-17 | PEUA-7 (34.4) PEUA-5 (23.3) | 2-EHMA (33.6) DEGMEMA (8.2) | — | 0.5 | — | 1 |
| R-18 | PEUA-9 (66.3) | 2-EHMA (33.3) | — | 0.4 | — | 1 |
| R-19 | PEUA-8 (66.2) | 2-EHMA (33.2) | — | 0.6 | — | 1 |
| R-20 | PEUA-8 (65.8) | 2-EHMA (33.0) | — | 0.4 | TiO$_2$ (0.8) | 1 |
| R-21 | PEUA-8 (64.2) | 2-BACOEA (35.3) | — | 0.5 | — | 1 |
| R-22 | PEUA-8 (64.9) | 2-BACOEA (32.7) DEGDMA (1.8) | — | 0.6 | — | 1 |
| R-23* | PEUA-8 (66.6) | 2-EHMA (32.9) | — | 0.5 | — | 1 |
| R-24* | PEUA-8 (66.3) | 2-EHMA (32.7) | — | 1.0 | — | 1 |
| R-25* | PEUA-2 (66.7) | IBMA (16.15) 2-EHMA (16.15) | — | 1.0 | — | 1 |
| R-26* | PEUA-2 (66.7) | HEMA (32.3) | — | 1.0 | — | 1 |
| R-27* | PEUA-3 (60) | HEMA (39) | — | 1.0 | — | 1 |
| R-28* | PEUA-1 (66.7) | HEMA (32.3) | — | 1.0 | — | 1 |
| R-29* | PEUA-2 (66.7) | 2-EHMA (32.3) | — | 1.0 | 1 | 1 |
| R-30* | PEUA-2 (66.45) | 2-EHMA (32.2) | — | 1.0 | TiO$_2$ (0.35) | 1 |

Example 20

Formulated resins were cured by placing samples of resin between glass microscope slides with spacers formed from 2 layers of black vinyl electrical tape, and placing in a Terresa UV nail gel curing lamp (70 W 365 nm and 405 nm LED array) for 1-2 minutes. The slide assembly was then placed in a beaker of either DI water or isopropanol for 2-5 minutes, followed by prying the slides apart to retrieve the cured films. Films from formulations that strongly adherent to glass were optionally prepared by sandwiching liquid resin between polyethylene film prior to curing by UV exposure for 1-2 minutes. 1-stage cure resins were post-cured by thermal post-curing at 70-100° C. in an oven, and irradiation in the nail gel lamp for 5-10 minutes. 2-stage cure resins were further post-cured for 2-4 hours in a 100-125° C. oven.

Resins prepared at sufficient scale (>70 grams) were 3D printed to form tensile testing specimens on an ELEGOO Mars LCD-UV type printer (40 W 405 nm LED array) equipped with an enclosure heater and thermostat. This apparatus serves as an example and is not intended to limit the scope of this invention. Tensile dogbone specimens were printed to conform to ISO 527-2 specimen 1A or specimen 5A shape at reduced overall dimensions to accommodate 5-6 specimens in a single print batch. The print file was generated ("sliced") using ChiTuBox 64-bit software with layer thickness of 0.05 mm, a base layer count of 5 at 45-80 seconds exposure and interlayer curing time of 20-60 seconds. Cure times are expected to vary depending on apparatus lamp power or printer type (e.g. stereolithography, digital light processing, polyjet or UV-LCD printer). Printed samples were washed and soaked in isopropanol or acetone for 5-30 minutes, air dried for 20 minutes to 1 hour, post-cured in a 40-100° C. oven for 1 hour, and 10 minutes (5×2 minute intervals) of UV exposure on a Terresa UV nail gel flood curing lamp (~70 W output 405 nm UV light). Tensile properties were determined by uniaxial tensile testing of pre-measured dogbone specimens on an Instron universal testing instrument equipped with a 5 kN load transducer at a strain rate of 120 mm/min until failure at room temperature.

Figure 2:
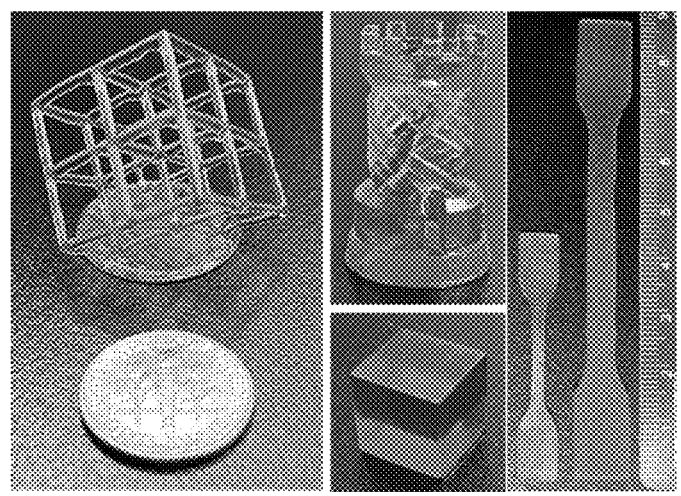
FIG. 2 depicts 3D printed and post-cured specimens obtained with the compositions described herein.

Upon curing, all resins lacking filler shown in Table 4 provided transparent (non-opaque) films. The qualitative description of resin formulations prior to and after photopolymerization are presented in Table 4. Tensile properties of selected printed resins are summarized in Table 5. Photographs of 3D objects printed with resins R-23 and R-24 are presented in FIG. 2. It is notable that the mechanical specifications of the resins described in this invention incorporating chemically recycled post-consumer plastic waste are comparable to commercially available engineering resins from photopolymer producers such as Carbon 3D and Formlabs. Furthermore, we have demonstrated that these resins are suitable for the generation of complex and detailed shapes in a manner that is comparable to commercially available photopolymer resins prepare from petroleum-derived or bio-based chemical building blocks.

TABLE 4

Qualitative characteristics of formulated resins and post-cured photopolymers.

| Sample | Formulated Resin | Cured Photopolymer |
| --- | --- | --- |
| R-1 | Viscous (~molasses) amber clear liquid | Brittle and hard, amber |
| R-2 | Viscous (~honey) amber clear liquid | Very brittle and rigid, amber |
| R-3 | Very viscous brown liquid | Semi-rigid, some flex, amber |
| R-4 | Very viscous brown liquid | Semi-rigid, more flex, amber |
| R-5 | Very viscous brown liquid | Very flexible, somewhat stretchy, amber |
| R-6 | Viscous amber liquid | Semi-rigid, more flex, amber |
| R-7 | Relatively low viscosity amber resin | Very flexible, stretchy, amber |
| R-8 | Viscous transparent stringy amber | Flexible, slightly stretchy, amber |
| R-9 | Viscous transparent stringy amber | Semi-rigid, somewhat brittle, amber |
| R-10 | Opaque, viscous, honey color resin | Semi-rigid, somewhat tacky, amber |
| R-11 | Very viscous opaque paste, flax color | Semi-flexible, amber |
| R-12 | Transparent, low viscosity, brown | Semi-rigid, some flex, dark amber |
| R-13 | Opaque viscous paste, flax color | Semi-flexible, amber |
| R-14 | Clear, low viscosity, honey | Semi-rigid, creasable, pale amber |
| R-15 | Opaque black, low viscosity | Semi-rigid, brittle, translucent black |
| R-16 | Clear, honey color, low viscosity | Brittle, sparkly, pale amber |
| R-17 | Relatively low viscosity, turbid | Semi-flexible, amber color |
| R-18 | Relatively viscous, clear | Very flexible, somewhat stretchy, amber |
| R-19 | Low viscosity, clear, pale amber | Semi-rigid, creasable, pale amber |
| R-20 | Low viscosity, opaque, off-white | Semi-rigid, opaque, polar bear color |
| R-21 | Amber, low viscosity, clear | Semi-flexible, creasable, amber |
| R-22 | Amber, low viscosity, clear | Semi-flexible, creasable, amber |
| R-23* | Low viscosity, pourable, amber color | Semi-flexible when printed, amber |
| R-24* | Low viscosity, pourable, amber color | Semi-flexible when printed, amber |
| R-25* | Low viscosity, pourable, amber color | Semi-rigid when printed, amber |
| R-26* | Low viscosity, pourable, amber color | Semi-rigid when printed, amber |
| R-27* | Low viscosity, pourable, amber color | Semi-flexible when printed, yellow |
| R-28* | Low viscosity, pourable, transparent orange color | Semi-rigid when printed, orange |
| R-29* | Low viscosity, pourable, amber color | Semi-flexible when printed, yellow |
| R-30* | Low viscosity, pourable, opaque cream color | Semi-flexible when printed, off-white/bone colored |

TABLE 5

Tensile specifications determined for selected printed dogbones from photopolymer resins derived in part from chemically recycled post-consumer plastic (polyethylene) waste.

| Sample | Tensile (Young's) Modulus (GPa) | Max Tensile Stress (Tensile Strength) (MPa) | Tensile Strain at Break (%) |
|---|---|---|---|
| R-23 | 0.024 ± 0.005 | 13.2 ± 2.0 | 119 ± 9 |
| R-24 | 0.051 ± 0.010 | 14.2 ± 0.6 | 103 ± 4 |
| R-25 | 0.835 ± 15 | 26 ± 1 | 57 ± 11 |
| R-26 | 0.958 ± 81 | 36 ± 1 | 41 ± 15 |
| R-28 | 0.927 ± 38 | 35 ± 3 | 38 ± 22 |
| R-29 | 0.145 ± 12 | 20 ± 1 | 109 ± 5 |
| R-30 | 0.332 ± 88 | 21 ± 4 | 99 ± 17 |

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Various embodiments of this application are described herein, including the best mode known to the inventors for carrying out the application. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A composition comprising a compound of the formula:

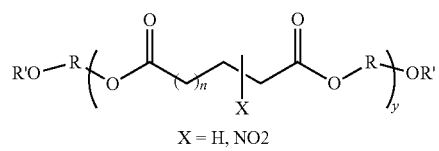

X = H, NO2 wherein n is 0-14, y is 1-100, X is either H or NO$_2$, R is an aliphatic, cycloaliphatic, aromatic, or oligoether linker, and R' is H or a photopolymerizable group, wherein at least one X is NO$_2$; and further comprising a compound of the formula:

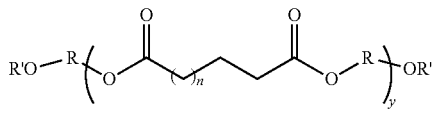

wherein n is 0-14, y is 1-100, R is an aliphatic, cycloaliphatic, aromatic, or oligoether linker, and R' is H or a photopolymerizable group.

2. The composition of claim 1 wherein R is an alkylenyl group.

3. The composition of claim 2, wherein R is ethylenyl, propylenyl, isopropylenyl, butylenyl, pentylenyl, hexylenyl, heptylenyl, or octylenyl.

4. The composition of claim 1, wherein R is an oligoether linker.

5. The composition of claim 1, wherein R is alkylenyl, wherein one or more CH$_2$ groups are substituted by —O—.

6. The composition of claim 5, wherein R is —(CH$_2$)$_o$—O—(CH$_2$)$_o$—, —CH(CH$_3$)CH$_2$—O—CH$_2$CH(CH$_3$)—, or —CH$_2$—O—(CH$_2$)$_o$—O—(CH$_2$)$_o$—CH$_2$—, wherein o is 2-8.

7. The composition of claim 1, wherein R is arylenyl or aralkylenyl.

8. The composition of claim 1, wherein R' is H.

9. A composition comprising a compound of the formula:

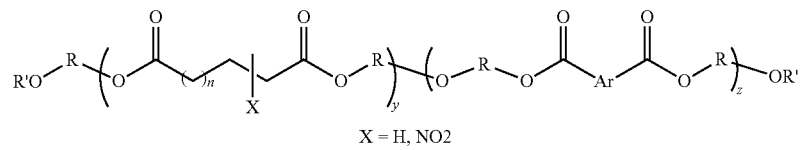

X = H, NO2 wherein n is 0-14, y is 1-100, z is 1-100, X is either H or NO$_2$, R is an aliphatic, cycloaliphatic, aromatic, or oligoether linker, Ar is an aromatic linker, and R' is H or a photopolymerizable group, wherein at least one X is NO$_2$.

10. The composition of claim 9 comprising a compound of the formula:

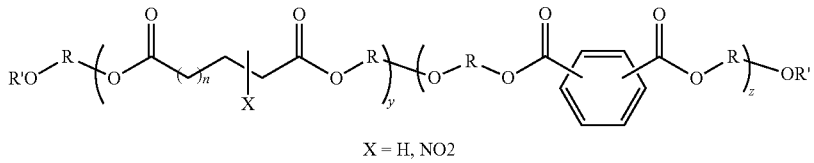

X = H, NO2 wherein n is 0-14, y is 1-100, z is 1-100, X is either H or NO$_2$, R is an aliphatic, cycloaliphatic, aromatic, or oligoether linker, and R' is H or a photopolymerizable group, wherein at least one X is NO$_2$.

11. The composition of claim 1, wherein R' is a photopolymerizable group comprising an ethylenically unsaturated free radical polymerizable group.

12. The composition of claim 1, wherein R' is a photopolymerizable group comprising a cationically polymerizable group.

13. The composition of claim 1, wherein R' is a photopolymerizable group comprising an acrylate ester.

14. The composition of claim 1, wherein R' is a photopolymerizable group comprising a methacrylate ester.

15. The composition of claim 1, comprising a compound of the formula:

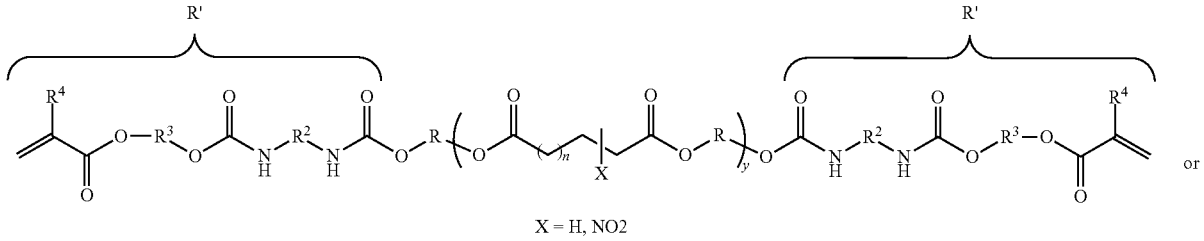

X = H, NO2 or

-continued

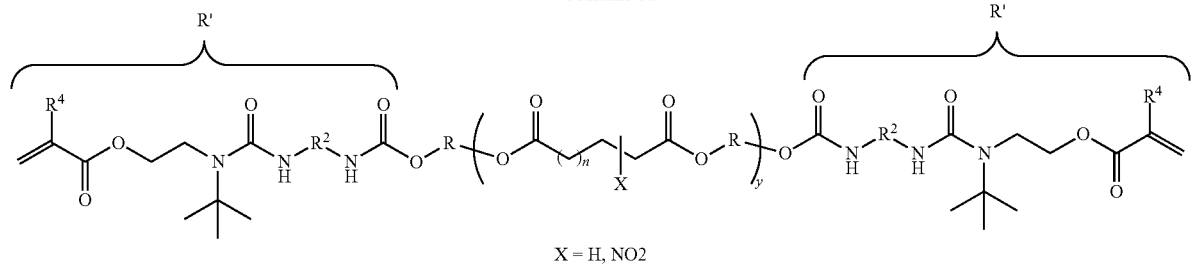

X = H, NO2 wherein n is 0-14, y is 1-100, X is either H or NO$_2$, R is an aliphatic, cycloaliphatic, aromatic, or oligoether linker, R$^2$ is an aliphatic, cycloaliphatic or aromatic linker, R$^3$ is an aliphatic, cycloaliphatic, or aromatic, or oligoether linker, and R$^4$ is either H or methyl, wherein at least one X is NO$_2$.

16. The composition of claim 1, wherein the composition is a radiation curable liquid further comprising one or more resins, reactive diluents, photoinitiator systems, or additives.

17. The composition of claim 16, wherein reactive diluents comprise one or more monomers containing at least one ethylenically unsaturated radically polymerizable group.

18. The composition of claim 16, wherein reactive diluents further comprise at least one cationically polymerizable group.

19. The composition of claim 16, wherein photoinitiator systems comprise one or more free radical photoinitiators or cationic photoinitiators.

20. A composition comprising a cured polymer obtained by the treatment of the composition claim 1 with actinic radiation.

21. The composition of claim 20, wherein the actinic radiation is electron beams, X-rays, UV or visible light.

22. The composition of claim 20 comprising multiple layers, obtained by depositing successive layers of the composition of claim 1 according to a predetermined pattern, and then curing the layers with actinic radiation.

23. The composition of claim 20, wherein the composition is obtained by depositing by ink jet printing, extrusion, vat polymerization, stereolithography or digital light processing.

24. The composition of claim 23, further comprising curing the composition by actinic radiation to give a 3D composition.

25. The composition of claim 23, wherein the actinic radiation is electron beams, X-rays, UV, or visible light.

* * * * *